US012591442B2

(12) United States Patent
Singh

(10) Patent No.: US 12,591,442 B2
(45) Date of Patent: *Mar. 31, 2026

(54) DETERMINING SEQUENCES OF INTERACTIONS, PROCESS EXTRACTION, AND ROBOT GENERATION USING GENERATIVE ARTIFICIAL INTELLIGENCE / MACHINE LEARNING MODELS

(71) Applicant: UiPath, Inc., New York, NY (US)

(72) Inventor: Prabhdeep Singh, Bellevue, WA (US)

(73) Assignee: UiPath, Inc., New York, NY (US)

( * ) Notice: Subject to any disclaimer, the term of this patent is extended or adjusted under 35 U.S.C. 154(b) by 349 days.

This patent is subject to a terminal disclaimer.

(21) Appl. No.: 18/448,342

(22) Filed: Aug. 11, 2023

(65) Prior Publication Data

US 2023/0393870 A1 Dec. 7, 2023

Related U.S. Application Data

(63) Continuation of application No. 18/447,511, filed on Aug. 10, 2023, which is a continuation-in-part of application No. 17/696,120, filed on Mar. 16, 2022, now Pat. No. 11,782,739, which is a continuation of application No. 17/070,168, filed on Oct. 14, 2020, now Pat. No. 11,301,269.

(51) Int. Cl.
*G06F 9/451* (2018.01)
*G06F 17/18* (2006.01)
*G06N 20/00* (2019.01)

(52) U.S. Cl.
CPC .............. *G06F 9/451* (2018.02); *G06F 17/18* (2013.01); *G06N 20/00* (2019.01)

(58) Field of Classification Search
CPC .......... G06F 9/451; G06F 17/18; G06N 20/00
USPC ......................................................... 715/704
See application file for complete search history.

(56) References Cited

U.S. PATENT DOCUMENTS

| | | | |
|---|---|---|---|
| 9,483,740 | B1 | 11/2016 | Ansel et al. |
| 9,555,544 | B2 | 1/2017 | Bataller et al. |
| 10,235,192 | B2 | 3/2019 | Hall et al. |

(Continued)

FOREIGN PATENT DOCUMENTS

| | | |
|---|---|---|
| CN | 111124888 A | 5/2020 |
| JP | 2020512122 A | 4/2020 |

(Continued)

OTHER PUBLICATIONS

William D Titcomb, "Notice of Allowance", issued Aug. 23, 2023, U.S. Appl. No. 17/696,120.

(Continued)

*Primary Examiner* — William D Titcomb
(74) *Attorney, Agent, or Firm* — LeonardPatel PC; Michael A. Leonard, II; Sheetal S. Patel

(57) ABSTRACT

Use of generative artificial intelligence (AI)/machine learning (ML) models is disclosed to determine sequences of user interactions with computing systems, extract common processes, and generate robotic process automation (RPA) robots. The generative AI/ML model may be trained to recognize matching n-grams of user interactions and/or a beneficial end state. Recorded real user interactions may be analyzed, and matching sequences may be implemented as corresponding activities in an RPA workflow.

23 Claims, 12 Drawing Sheets

(56) References Cited

U.S. PATENT DOCUMENTS

| | | | |
|---|---|---|---|
| 10,354,225 | B2 | 7/2019 | Sharma et al. |
| 10,365,799 | B2 | 7/2019 | Hosbettu et al. |
| 10,489,126 | B2 | 11/2019 | Kumar et al. |
| 10,613,838 | B2 | 4/2020 | Kim et al. |
| 10,956,181 | B2 | 3/2021 | Banne |
| 10,984,666 | B1 | 4/2021 | DePaolo et al. |
| 11,144,179 | B2 | 10/2021 | Sultan |
| 11,176,443 | B1 | 11/2021 | Selva et al. |
| 11,188,857 | B1 | 11/2021 | Hill |
| 11,226,832 | B2 | 1/2022 | Westberg et al. |
| 11,328,524 | B2 | 5/2022 | Cristescu et al. |
| 11,347,613 | B2* | 5/2022 | Singh .................. G06F 11/0754 |
| 2008/0215397 | A1 | 9/2008 | Bhattacharya et al. |
| 2011/0307228 | A1 | 12/2011 | Kasabov |
| 2014/0012626 | A1 | 1/2014 | Ajmera et al. |
| 2017/0308800 | A1 | 10/2017 | Cichon et al. |
| 2018/0039565 | A1* | 2/2018 | Rajagopalan ....... G06F 11/3698 |
| 2018/0052861 | A1 | 2/2018 | Seetharaman et al. |
| 2018/0113780 | A1* | 4/2018 | Kim .................... G06F 11/3051 |
| 2019/0051292 | A1 | 2/2019 | Na |
| 2019/0057457 | A1 | 2/2019 | Gao et al. |
| 2019/0102676 | A1 | 4/2019 | Nazari et al. |
| 2019/0102684 | A1 | 4/2019 | Beran et al. |
| 2019/0236458 | A1 | 8/2019 | Taylor et al. |
| 2019/0250891 | A1* | 8/2019 | Kumar ................... G06V 10/82 |
| 2019/0250893 | A1* | 8/2019 | Pandit ................... G06N 20/00 |
| 2019/0324781 | A1 | 10/2019 | Ramamurthy et al. |
| 2019/0332073 | A1* | 10/2019 | Nasle ............... G06Q 30/0206 |
| 2019/0354583 | A1 | 11/2019 | Ralhan |
| 2019/0379589 | A1* | 12/2019 | Ryan ...................... G06N 3/084 |
| 2020/0019418 | A1* | 1/2020 | P K ......................... G06F 9/453 |
| 2020/0033869 | A1 | 1/2020 | Palanisamy et al. |
| 2020/0206920 | A1* | 7/2020 | Ma ...................... G06F 11/3476 |
| 2020/0219033 | A1* | 7/2020 | Smutko ................... G06F 9/542 |
| 2020/0285977 | A1* | 9/2020 | Brebner .................... G06F 8/76 |
| 2021/0110345 | A1* | 4/2021 | Iyer ................... G06Q 10/0633 |
| 2021/0182100 | A1* | 6/2021 | Zhang ................... G06F 9/4881 |
| 2021/0304064 | A1* | 9/2021 | Mudi ...................... G06N 3/008 |
| 2021/0326743 | A1 | 10/2021 | Iftekharuddin et al. |
| 2021/0358488 | A1* | 11/2021 | Iyer ......................... G06F 40/30 |

FOREIGN PATENT DOCUMENTS

| | | | |
|---|---|---|---|
| KR | 20200094833 | A | 8/2020 |
| WO | 2016109755 | A1 | 7/2016 |
| WO | 2019010435 | A1 | 1/2019 |
| WO | 2020092446 | A3 | 8/2020 |

OTHER PUBLICATIONS

William D Titcomb, "Notice of Allowance", issued Sep. 13, 2023, U.S. Appl. No. 17/751,139.

Andrew Sornborger et al., "A Pulse-gated, Neural Implementation of the Backpropagation Algorithm," NICE '19, Albany, New York (Mar. 26-28, 2019).

International Search Report & Written Opinion, issued Feb. 3, 2022, PCT Application No. PCT/US21/53489.

International Search Report & Written Opinion, issued Jan. 24, 2022, PCT Application No. PCT/US21/53493.

Michael Nielsen, "Neural Networks and Deep Learning Chapter 2—How the Backpropagation Algorithm Works," available on the web at http://neuralnetworksanddeeplearning.com/chap2.html (Dec. 2019).

Wikipedia Backpropagation Page available at https://en.wikipedia.org/wiki/Backpropagation (last accessed Oct. 13, 2020).

William D Titcomb, "Letter Restarting Period for Response", issued Mar. 31, 2023, U.S. Appl. No. 17/696,120.

William D Titcomb, "Non-Final Office Action", issued Mar. 28, 2023, U.S. Appl. No. 17/696,120.

William D Titcomb, "Non-Final Office Action", issued Oct. 25, 2021, U.S. Appl. No. 17/070,168.

William D Titcomb, "Non-Final Office Action", issued Oct. 26, 2021, U.S. Appl. No. 17/129,740.

William D Titcomb, "Notice of Allowance", issued Feb. 16, 2022, U.S. Appl. No. 17/070,168.

William D Titcomb, "Notice of Allowance", issued Mar. 25, 2022, U.S. Appl. No. 17/129,740.

William D. Titcomb, "Non-Final Office Action", issued May 18, 2023, U.S. Appl. No. 17/751,139.

Office Action, issued Sep. 2, 2025, JP Patent Application No. 2023-518734.

William D Titcomb, "Non-Final Office Action", issued Oct. 14, 2025, U.S. Appl. No. 18/447,511.

William D Titcomb, "Notice of Allowance", issued Jan. 6, 2026, U.S. Appl. No. 18/447,511.

Office Action, issued Nov. 18, 2025, IN Patent Application No. 202317025530.

* cited by examiner

300

FIG. 5
500
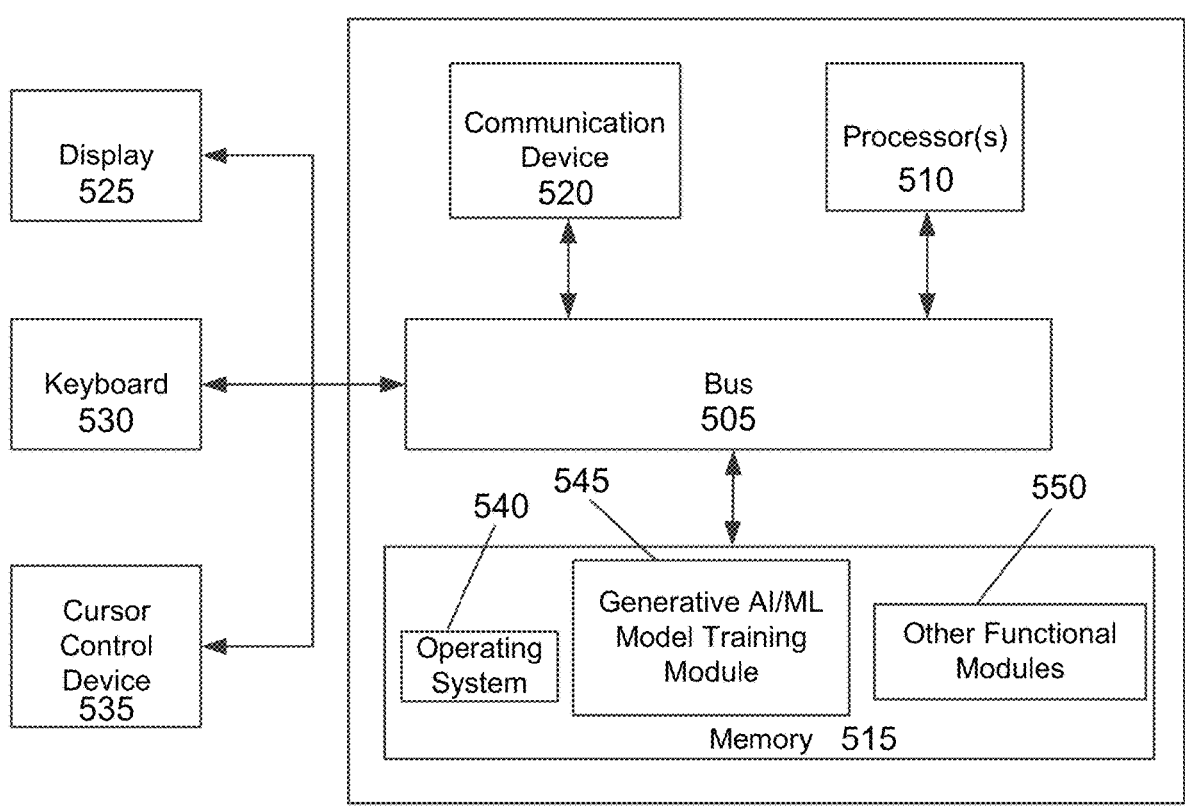

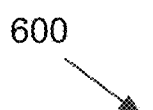
FIG. 6A
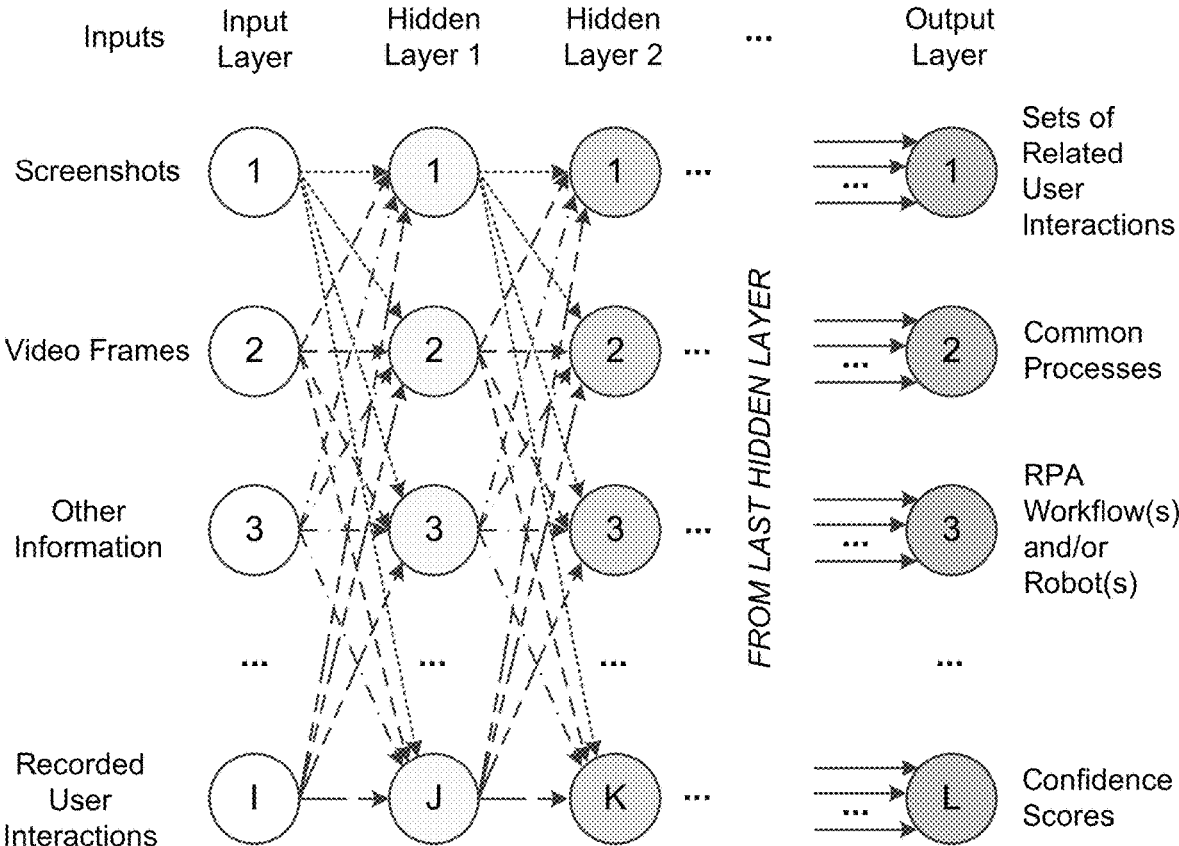

Figure 7:
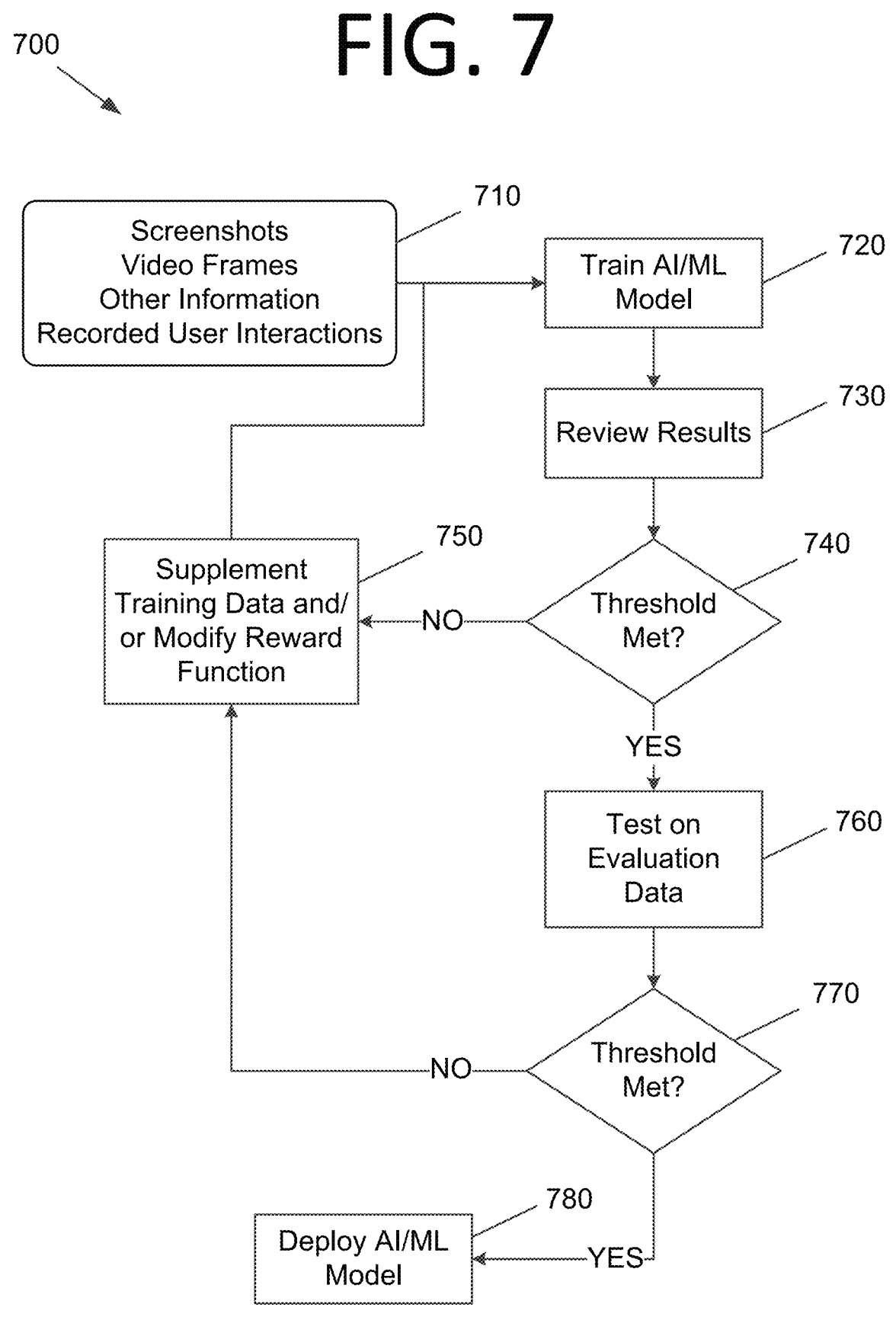

Screenshots
Video Frames
Other Information
Recorded User Interactions
710

Train AI/ML Model
720

Review Results
730

Threshold Met?
740

Supplement Training Data and/ or Modify Reward Function
750

NO

YES

Test on Evaluation Data
760

Threshold Met?
770

NO

Deploy AI/ML Model
780

YES

800

900

DETERMINING SEQUENCES OF INTERACTIONS, PROCESS EXTRACTION, AND ROBOT GENERATION USING GENERATIVE ARTIFICIAL INTELLIGENCE / MACHINE LEARNING MODELS

CROSS-REFERENCE TO RELATED APPLICATIONS

This application is a continuation of, and claims the benefit of, U.S. Nonprovisional patent application Ser. No. 18/447,511, filed Aug. 10, 2023, which is a continuation-in-part (CIP) of, and claims the benefit of, U.S. Nonprovisional patent application Ser. No. 17/696,120 filed Mar. 16, 2022, which is a continuation of, and claims priority to, U.S. Nonprovisional patent application Ser. No. 17/070,168 filed Oct. 14, 2020, which issued as U.S. Pat. No. 11,301,269 on Apr. 12, 2022. The subject matter of these earlier filed applications is hereby incorporated by reference in its entirety.

FIELD

The present invention generally relates to user interface (UI) automation, and more specifically, to determining sequences of user interactions with computing systems, extracting common processes, and generating robotic process automation (RPA) robots using generative artificial intelligence (AI)/machine learning (ML) models.

BACKGROUND

In order to perform UI automation, RPA technologies may utilize driver and/or application-level interactions to click buttons, enter text, and perform other interactions with a UI. However, key presses, mouse clicks, and other kernel hook information may not be available at the system level in some embodiments, or when building a new UI automation platform. Extensive driver level and application level functionality is typically required to implement such a UI automation platform. Furthermore, the way in which users interact with their computing systems may not be known. Accordingly, alternative techniques for providing UI automation may be beneficial.

SUMMARY

Certain embodiments of the present invention may provide solutions to the problems and needs in the art that have not yet been fully identified, appreciated, or solved by current UI automation technologies. For example, some embodiments of the present invention pertain to determining sequences of user interactions with computing systems, extracting common processes, and generating RPA robots using generative AI/ML models.

In an embodiment, a computer-implemented method includes providing, by a computing system, a generative AI/ML model with data including time-ordered interactions of a plurality of users with respective user computing systems. The computer-implemented method also includes training the generative AI/ML model, by the computing system, to recognize related sequences of user interactions that pertain to tasks in the time-ordered sequences of user interactions by comparing n-grams of sequences of user interactions in recorded data from the computing systems over a sliding window to find the related sequences. The n-grams include two or more values of n. The computer-implemented method further includes deploying the trained generative AI/ML model.

In another embodiment, a non-transitory computer-readable medium stores a computer program. The computer program is configured to cause at least one processor to analyze recorded real user interactions of a plurality of users with respective computing systems and determine sets of matching sequences in the recorded real user interactions, by a generative AI/ML model. The computer program is also configured to cause the at least one processor to generate one or more respective RPA workflows including activities that implement user interactions of the determined sets of matching sequences.

In yet another embodiment, a system includes memory storing computer program instructions and at least one processor configured to execute the computer program instructions. The computer program instructions are configured to cause the at least one processor to analyze recorded real user interactions of a plurality of users with respective computing systems and determine matching sequences in the recorded real user interactions, by a generative AI/ML model. The computer program instructions are also configured to cause the at least one processor to determine a most efficient sequence of the matching sequences. The computer program instructions are further configured to cause the at least one processor to generate one or more respective RPA workflows including activities that implement user interactions of the determined most efficient matching sequence.

In still another embodiment, a computer-implemented method includes providing, by a computing system, a generative AI/ML model with data comprising time-ordered interactions of a plurality of users with respective user computing systems. The computer-implemented method also includes training the generative AI/ML model, by the computing system, to recognize related sequences of user interactions that pertain to tasks in the time-ordered sequences of user interactions by comparing n-grams of sequences of user interactions in recorded data from the computing systems over a sliding window to find the related sequences. The n-grams include two or more values of n. The computer-implemented method further includes deploying the trained generative AI/ML model. The training includes training the generative AI/ML model to determine a highest value of n such that n-grams above the highest value of n are not considered.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 5 is an architectural diagram illustrating a computing system configured to determine sequences of user interactions with computing systems, extract common processes, and generate RPA robots using generative AI/ML models, according to an embodiment of the present invention.

FIG. 6A illustrates an example of a neural network that has been trained to determine sequences of user interactions with computing systems, extract common processes, and generate RPA robots using generative AI, according to an embodiment of the present invention.

FIG. 7 is a flowchart illustrating a process for training AI/ML model(s), according to an embodiment of the present invention.

Unless otherwise indicated, similar reference characters denote corresponding features consistently throughout the attached drawings.

DETAILED DESCRIPTION OF THE EMBODIMENTS

Figure 1:
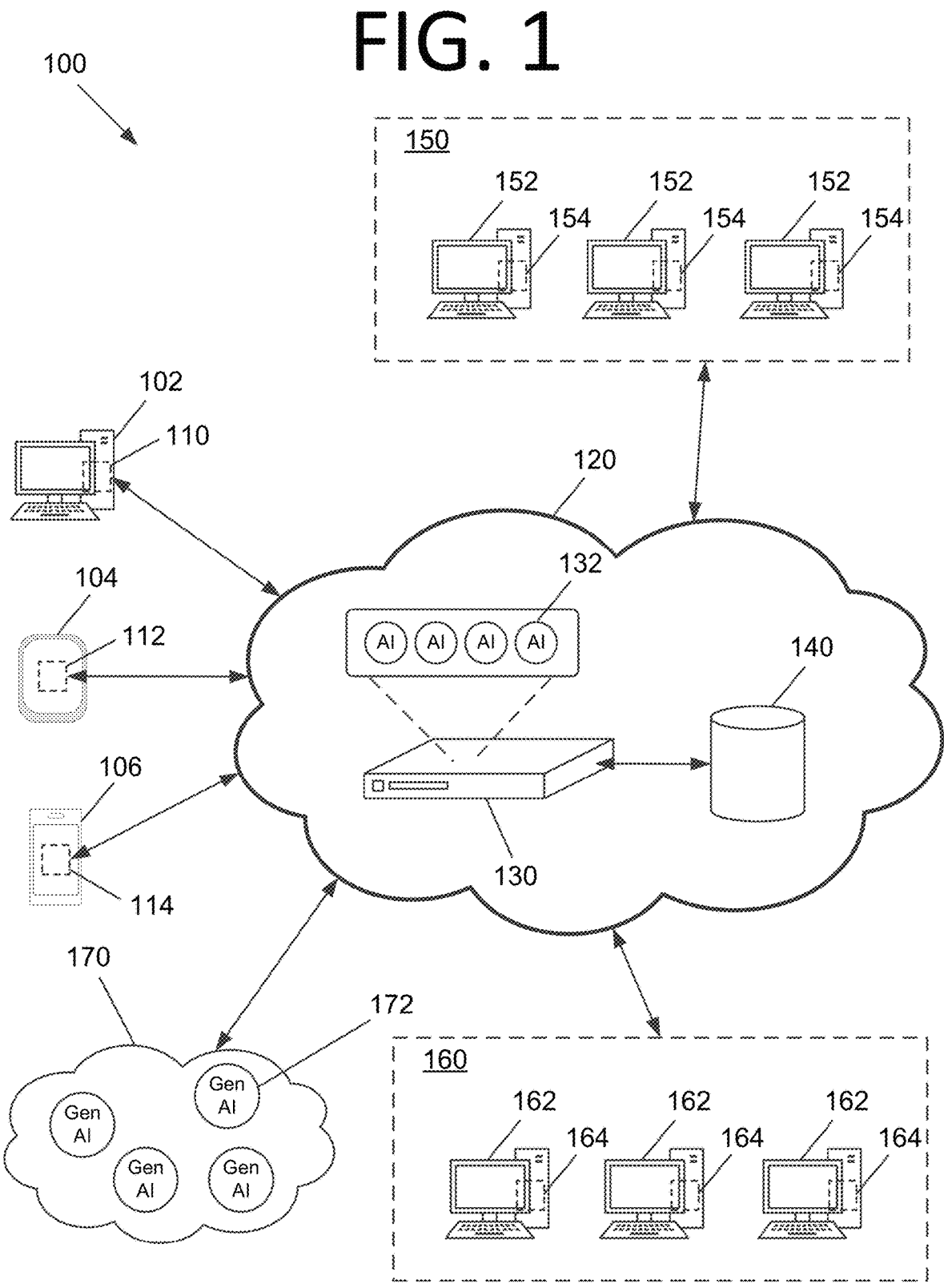
FIG. 1 is an architectural diagram illustrating a hyper-automation system, according to an embodiment of the present invention.

Some embodiments pertain to determining sequences of user interactions with computing systems, extracting common processes, and generating RPA robots using generative AI/ML models. The user interactions may be determined by a generative AI/ML model that is trained to recognize applications, screens, and UI elements using computer vision (CV) and to recognize user interactions with the applications, screens, and UI elements. This generative AI/ML model may be the same AI/ML model that subsequently searches for sequences or a different AI/ML model. Individual user interactions may include, but are not limited to, a user clicking a button, entering text in a field, interacting with a menu, closing a window, moving to a different screen of an application, etc. An example of a sequence of user interactions may include, for example, opening an application, typing information into multiple text fields, and clicking a submit button.

User interactions may be extracted from data collected from multiple computing systems. For instance, the collected data may include video alone and/or other data collected from the computing systems, such as browser history, heat maps, file information, currently running applications and locations, system level and/or application-level information, etc. The extracted user interactions may then be combined into a sequence of interactions associated with a larger activity or task, such as writing and sending an email, entering information into a form and submitting it, modifying a spreadsheet based on information retrieved from a website, etc.

In some embodiments, n-grams of multiple sizes may be used to search for matching sequences in the data. If the lowest value of n is too small, too many matching sequences may be found to identify meaningful sequences. Conversely, if the lowest value of n is too large, meaningful matching sequences smaller than n may be missed. During training, a human reviewer could review identified sequences of a certain starting size n (e.g., 2, 3, 7, etc.). If this size yields too many non-useful sequences, the smallest sequence size may be incremented to n+1, then n+2, then n+3, etc. until the matching sequences tend to be useful. After the smallest useful n is determined (e.g., a smallest n that produces at least 10% useful sequences, at least 30%, at least 50%, at least 90%, etc.), sequences of that n-gram size or less may be ignored or not determined/considered. In some embodiments, the generative AI/ML model may automatically choose a minimum value for n based on a maximum number of matching sequences. In certain embodiments, a certain number of matches may be required for a sequence of a certain n-gram size to be considered. For instance, in a large organization, it may be required for dozens, hundreds, or thousands of matches to exist in order to automate the sequence since this would tend to indicate that multiple or many users perform this process.

Recurrent neural networks (RNNs) may be particularly adept at determining useful ranges of the values of n. An RNN may determine the optimum windowing threshold (i.e., the useful range of n values) via a trial-and-error process that involves a sweep of n-grams of varying sizes for useful sequences, and potentially a sweep of all sequence sizes in some embodiments. The RNN can then determine the most optimal range, potentially without human input. Such a system could be used to automatically determine whether a user is likely to leave a cloud computing service, for example, by looking for time-windowed sequences of user interactions that tended to indicate that a user was likely to leave the service. Steps could then be taken to try to retain the customer (e.g., having a human representative contact the customer, offering a lower service price, etc.).

In some embodiments, an upper bound on n may also be determined. For instance, if less than a certain number of sequences are found at and above a certain value of n, or no sequences are found at all, the size of n may be limited to less than that value. Also, if n is too large, the sequence may correspond to more than a given task and include other unrelated actions that more than one user happened to perform. This determination may be made by a human reviewer or automatically.

In certain embodiments, importance metric(s) may be used in addition to or in lieu of some or all of the sequence-limiting techniques discussed above. For instance, it may be considered whether a sequence of actions generates at least a certain amount of revenue, saves at least a certain amount of revenue, increases efficiency/speed of a task by at least a certain amount, speeds up the customer acquisition process, reduces the number of communications that are required, a combination thereof, etc. Such importance metric(s) may assist in the identification of sequences and processes that should be automated first and would benefit the most from RPA.

To find sequences, n-grams may be applied using a sliding window. See FIG. 10, for example. For instance, if the current value of n is 5, the first 5 interactions by a user may be compared to all time-ordered sequences of 5 interactions from other users, then interactions 2-6, 3-7, 4-8, etc. may be compared until all time ordered sets of the user's interactions of that size have been compared to those of other users being considered. Alternatively, all user interactions of the sizes of n that are being considered could be identified and retrieved from the time-ordered sequence of interactions for each user and stored in a database. For each n, matching sequences and the number of matches could be identified without using a sliding window. Importance metric(s) could also be applied to these matching sequences.

In some embodiments, the generative AI/ML model or process that calls the generative AI/ML model is able to associate the interactions in the identified matching sequences with respective RPA activities. For instance, an interaction where the user clicks a "Submit" button may be associated with one or more RPA activities that identify the button on the screen, move the mouse to be within the area of the button, and click it. The generative AI/ML model, or some other application using the generative AI/ML model to identify sequences or the output thereof, may thus generate a "skeleton" RPA workflow that can be reviewed by an RPA developer, modified as desired, and implemented as an RPA robot. Chains of tasks may be used to create a draft RPA workflow, which can then be exported to an RPA designer application. Alternatively, an RPA developer may be provided with the sequence and be instructed to build a workflow implementing the sequence. Over time, the generative AI/ML model may become accurate enough that workflows for the sequences are created, and RPA robots implementing the workflows are generated and deployed, without human action.

Some sequences of interactions may be at least slightly different, but accomplish the same task. In order to identify that such sequences are functionally the same, some embodiments generate a probability graph that includes loose associations. Each possible or observed interaction, or a subset thereof, may be included as a node in the graph. The generative AI/ML model may calculate the probability that a user would "hop" from one node to another (i.e., probability that a user would follow an edge between nodes). For example, if a spreadsheet is open, the probability of a user's next interaction being calculating the sum of a column may be high, but the probability of the next interaction being opening an email application may be relatively low. Edges may provide probabilities between nodes, and potentially of a sequence of nodes as a series of segments therebetween. Such a sequence and its edges may provide a collective probability of starting at one node and arriving at another node via the sequence.

The probability graph may then be "pruned" after determining the edge probabilities to find related sequences. For instance, edge probabilities below 50%, 25%, 10%, etc. may be removed to reduce the number of edges and sequences). A Levenshtein distance, fuzzy matching (e.g., where matching parameters are similar within a certain fuzziness threshold, such as within a 20% variation), and/or any other suitable technique may be used to determine related sequences without deviating from the scope of the invention. For instance, two, three, or more sequences may lead to a certain end node with at least a certain probability, making it likely that users use these at least somewhat different sequences to accomplish the same task.

In some embodiments, the most efficient path among multiple related sequences may be desired. This may be determined based on the number of interactions/steps, the time associated with each step (e.g., as obtained from timestamps in the time-ordered data pertaining to the user interactions), etc. An RPA workflow may then be generated based on the most efficient sequence that accomplishes that task.

In some embodiments, more complex interactions may be recognized and anticipated. For instance, localized control information could be used to determine interactions that are less obvious visually. Consider an example where a user wants to synchronize playlists between two applications (e.g., from iTunes® to Spotify®). A user may typically copy a song title from iTunes®, put the song title in the Spotify® search box, search for the song, and repeat the process for the next song until the playlist is copied. The generative AI/ML model of some embodiments may recognize that the granular task of copying songs is repeated for all songs in a playlist and prompt the user regarding whether he or she would like to copy all songs in the playlist.

In some embodiments, the generative AI/ML model may learn to automatically complete fields based on observing examples. For instance, if a user creates accounts from a data source that require various information from that data source, the generative AI/ML model may observe that the user has entered information in several fields, generate a script to auto-fill all fields, and then ask the user whether he or she would like the fields to be automatically filled. The generative AI/ML model could be deep learning neural network (DLNN)-trained, generative adversarial network (GAN)-trained, a combination thereof, etc.

In some embodiments, the generative AI/ML may be trained to recognize desirable outcomes and to determine the process(es) that lead to the desirable outcomes. For instance, the generative AI/ML model may be trained to recognize that an account was created, a new user was added, revenue was generated, a problem was resolved, etc. The generative AI/ML model may then look backwards in the data pertaining to the user interactions or the user interactions themselves to recreate the sequence that lead to the desirable outcome. The generative AI/ML model or another process could then associate the interactions with activities and generate an RPA workflow that implements the sequence/process. This may be called "programming by example," where examples are provided to the generative AI/ML model, which then generates a program that can replicate the desirable end state.

Modern networks are essentially large probability graphs. Once a desirable outcome is determined, the generative AI/ML model may look backwards at the priors and rate what mattered the most to achieve the desired outcome. If it is determined that revenue increased as an outcome, the signal that lead to the outcome may be resolved into sub-signals, and it may be determined which sub-signal(s) lead to the revenue increase.

In some embodiments, backpropagation may be used for neural networks. Much of modern deep learning is based on backpropagation algorithms, which are mathematically founded in optimization theory. Many recent modifications and improvements to deep learning owe much of their structure to what is known of how information is processed by the architecture of the human brain. In other words, deep learning typically makes use of a layered, feedforward network similar to the early layers of the visual cortex. The nonlinearities at each layer are usually threshold nonlinearities, as are found in mean-field approximations of neuronal integrate-and-fire models. Convolutional deep networks implement an approximate translational symmetry that is also found in the visual cortex. Various techniques may be used for backpropagating errors in neural networks, including, but not limited to: (1) providing a second network to backpropagate errors; (2) providing differences in basal and apical dendritic responses to spiking input to justify backpropagation through the same layers as forward propagation; (3) using global reinforcement learning; (4) using bidirectional recirculation in recurrent networks; and (5) using contrastive Hebbian learning.

Neural networks are typically pulse-gated, where whether a "neuron" fires is based on the strength of the pulse and a mathematical function assigned to the neuron. Information comes in and leaves in the form of "spikes". A spike is an event and a "synapse" governs how much a downstream neuron responds to the event. Spikes from one neuron may thus propagate to others, depending on the specific connections and logic of the neural network.

The nature of these connections and synapses controls behavior. A given neuron may take the synaptic weights of incoming synapses for which a spiking event occurred, sum them, and then determine whether to generate a spike. Spikes may not vary in intensity in some embodiments and are thus somewhat analogous to one bit being sent out. Typical implementations may include neurons connected on a bus where communication is a time stamp. In other words, a spike is emitted as an event from one neuron at a certain time and is subsequently received by downstream neurons.

When the information gets to the downstream neurons, a thresholded activity function may be used where nothing happens if the value is below a threshold, but then the function linearly responds above the threshold (i.e., a rectified linear unit (ReLU)). ReLU functions are often used in deep learning since real neurons can have approximately similar activity functions. Via linear transforms, information can be subtracted, added, etc. In supervised learning, a known output may be computed with network output and error may be computed with a cost function from known target output, which gives the error for backpropagation. Error may be computed at the output, and this error may be transformed into corrections for network weights to minimize the error.

The standard learning algorithm of some embodiments is Hebbian learning, which modifies the weights by updating individual synapses based on the product of the firing rates in pre-synaptic neurons and the firing rates at the receiving neurons (i.e., the post-synaptic neurons). For Hebbian learning (i.e., synaptic modification) to take place, pre-synaptic and post-synaptic firing rates should be non-zero within a relatively short window of time. Otherwise, synapses are not modified. In some embodiments, outside of this window of time, the synaptic weight may decrease proportional to its value.

Via pulse-gating, firing rates may be propagated to pre-synaptic and post-synaptic neurons within a window of time during which Hebbian learning takes place. Thus, using pulse-gated learning, and hence, synaptic modification, firing rates can control the onset and offset of learning and may be used for synaptic weight updates to implement the backpropagation algorithm.

Backpropagation is a technique for optimizing synaptic weights in a feedforward neural network. Using backpropagation, backward propagation of errors for synaptic weight update may be performed. This allows for strengthening of the "neurons" that tend to lead to a desirable outcome. Potentially somewhat similar to the probability graph process discussed above, the nodes that appear to lead to the desirable outcome may be iteratively strengthened until the desirable outcome can be reproduced. The connections between the nodes and their probabilistic weights may make their behavior almost analog in nature.

Per the above, in some embodiments, determined sequences of user interactions may be prioritized based on various metrics. For instance, sequences that are more common, provide a greater time savings to users through automation, etc. may be prioritized for RPA workflow generation. RPA robots implementing the sequences may be generated and deployed to the user computing systems to accomplish the tasks associated with the common sequences.

Typically, automating a significant number of sequences of user interactions (e.g., 100) would require a substantial amount of code in a programming language. However, some embodiments generate RPA robots that implement sequences of user interactions with much less or no coding. Indeed, task mining may be performed exclusively via AI, or via AI with some human supplementing.

In some embodiments, sequences may not need to be recognized at all. For example, associations between interactions and repetition may be tracked. Neural networks can remember associative data without memory overhead. Whereas traditionally, reverse indexes are used where if a user performs an action, another action is taken using the reverse index. However, these reverse indexes can become very large from a resource perspective in real world systems. Neural networks, on the other hand, can be trained to accomplish the same or similar outcomes by strengthening nodes in the neural network for the association graph without this memory overhead.

In some embodiments, AI can be used to perform the entire process end-to-end. For instance, generative AI/ML model(s) may be used to determine which applications users are using, their graphical elements, and user interactions, determine common sequences of user interactions, and automatically build and deploy an RPA robot that implements the sequence of interactions at runtime without design time development. Training data may then be obtained from users regarding scenarios where the automatically developed robots do work or an anomaly is encountered, and this training data can be used to retrain the RPA robots and deploy them. The training data may include regions in images where misidentifications occurred or elements were missed, label corrections, input corrections, etc. This process may be repeated to iteratively improve the robots.

FIG. 1 is an architectural diagram illustrating a hyper-automation system 100, according to an embodiment of the present invention. "Hyper-automation," as used herein, refers to automation systems that bring together components of process automation, integration tools, and technologies that amplify the ability to automate work. For instance, RPA may be used at the core of a hyper-automation system in some embodiments, and in certain embodiments, automation capabilities may be expanded with AI/ML, process mining, analytics, and/or other advanced tools. As the hyper-automation system learns processes, trains AI/ML models, and employs analytics, for example, more and more knowledge work may be automated, and computing systems in an organization, e.g., both those used by individuals and those that run autonomously, may all be engaged to be participants in the hyper-automation process. Hyper-automation systems of some embodiments allow users and organizations to efficiently and effectively discover, understand, and scale automations.

Hyper-automation system 100 includes user computing systems, such as desktop computer 102, tablet 104, and smart phone 106. However, any desired user computing system may be used without deviating from the scope of the invention including, but not limited to, smart watches, laptop computers, servers, Internet-of-Things (IoT) devices, etc. Also, while three user computing systems are shown in FIG. 1, any suitable number of user computing systems may be used without deviating from the scope of the invention. For instance, in some embodiments, dozens, hundreds, thousands, or millions of user computing systems may be used. The user computing systems may be actively used by a user or run automatically without much or any user input.

Each user computing system 102, 104, 106 has respective automation process(es) 110, 112, 114 running thereon. In some embodiments, the automation processes are stored remotely (e.g., on server 130 or in database 140 and accessed via network 120) and loaded by RPA robots to implement the automation. Automations may exist as a script (e.g., XML, XAML, etc.) or be compiled into machine readable code (e.g., as a digital link library).

Automation process(es) 110, 112, 114 may include, but are not limited to, RPA robots, part of an operating system, downloadable application(s) for the respective computing system, any other suitable software and/or hardware, or any combination of these without deviating from the scope of the invention. In some embodiments, one or more of process(es) 110, 112, 114 may be listeners. Listeners may be RPA robots, part of an operating system, a downloadable application for the respective computing system, or any other software and/or hardware without deviating from the scope of the invention. Indeed, in some embodiments, the logic of the listener(s) is implemented partially or completely via physical hardware.

Listeners monitor and record data pertaining to user interactions with respective computing systems and/or operations of unattended computing systems and send the data to a core hyper-automation system 120 via a network (e.g., a local area network (LAN), a mobile communications network, a satellite communications network, the Internet, any combination thereof, etc.). The data may include, but is not limited to, which buttons were clicked, where a mouse was moved, the text that was entered in a field, that one window was minimized and another was opened, the application associated with a window, etc. In certain embodiments, the data from the listeners may be sent periodically as part of a heartbeat message. In some embodiments, the data may be sent to core hyper-automation system 120 once a predetermined amount of data has been collected, after a predetermined time period has elapsed, or both. One or more servers, such as server 130, receive and store data from the listeners in a database, such as database 140.

Automation processes may execute the logic developed in workflows during design time. In the case of RPA, workflows may include a set of steps, defined herein as "activities," that are executed in a sequence or some other logical flow. Each activity may include an action, such as clicking a button, reading a file, writing to a log panel, etc. In some embodiments, workflows may be nested or embedded.

Long-running workflows for RPA in some embodiments are master projects that support service orchestration, human intervention, and long-running transactions in unattended environments. Human intervention comes into play when certain processes require human inputs to handle exceptions, approvals, or validation before proceeding to the next step in the activity. In this situation, the process execution is suspended, freeing up the RPA robots until the human task completes.

A long-running workflow may support workflow fragmentation via persistence activities and may be combined with invoke process and non-user interaction activities, orchestrating human tasks with RPA robot tasks. In some embodiments, multiple or many computing systems may participate in executing the logic of a long-running workflow. The long-running workflow may run in a session to facilitate speedy execution. In some embodiments, long-running workflows may orchestrate background processes that may contain activities performing application programming interface (API) calls and running in the long-running workflow session. These activities may be invoked by an invoke process activity in some embodiments. A process with user interaction activities that runs in a user session may be called by starting a job from a conductor activity (conductor described in more detail later herein). The user may interact through tasks that require forms to be completed in the conductor in some embodiments. Activities may be included that cause the RPA robot to wait for a form task to be completed and then resume the long-running workflow.

One or more of automation process(es) 110, 112, 114 is in communication with core hyper-automation system 120. In some embodiments, core hyper-automation system 120 may run a conductor application on one or more servers, such as server 130. While one server 130 is shown for illustration purposes, multiple or many servers that are proximate to one another or in a distributed architecture may be employed without deviating from the scope of the invention. For instance, one or more servers may be provided for conductor functionality, AI/ML model serving, authentication, governance, and or any other suitable functionality without deviating from the scope of the invention. In some embodiments, core hyper-automation system 120 may incorporate or be part of a public cloud architecture, a private cloud architecture, a hybrid cloud architecture, etc. In certain embodiments, core hyper-automation system 120 may host multiple software-based servers on one or more computing systems, such as server 130. In some embodiments, one or more servers of core hyper-automation system 120, such as server 130, may be implemented via one or more virtual machines (VMs).

In some embodiments, one or more of automation process(es) 110, 112, 114 may call one or more AI/ML models 132 deployed on or accessible by core hyper-automation system 120 and trained to accomplish various tasks. For instance, AI/ML models 132 may include models trained to look for various application versions, perform CV, generate UI descriptors, offer suggestions for next activities or sequences of activities in RPA workflows, etc. AI/ML models may be trained using labeled data that includes, but is not limited to, screenshots of various application screens for various versions with their corresponding UI elements, libraries of UI objects, etc. AI/ML models 132 may be trained to achieve a desired confidence threshold while not being overfit to a given set of training data.

AI/ML models 132 may be trained for any suitable purpose without deviating from the scope of the invention, as will be discussed in more detail later herein. Two or more of AI/ML models 132 may be chained in some embodiments (e.g., in series, in parallel, or a combination thereof) such that they collectively provide collaborative output(s). AI/ML models 132 may perform or assist with CV, OCR, document processing and/or understanding, semantic learning and/or analysis, analytical predictions, process discovery, task mining, testing, automatic RPA workflow generation, sequence extraction, clustering detection, audio-to-text translation, any combination thereof, etc. However, any desired number and/or type(s) of AI/ML models may be used without deviating from the scope of the invention. Using multiple AI/ML models may allow the system to develop a global picture of what is happening on a given computing system, for example. For instance, one AI/ML model could perform OCR, another could detect buttons, another could compare sequences, etc. Patterns may be determined individually by an AI/ML model or collectively by multiple AI/ML models. In certain embodiments, one or more AI/ML models are deployed locally on at least one of computing systems 102, 104, 106.

In some embodiments, multiple AI/ML models 132 may be used. Each AI/ML model 132 is an algorithm (or model) that runs on the data, and the AI/ML model itself may be a deep learning neural network (DLNN) of trained artificial "neurons" that are trained on training data, for example. In some embodiments, AI/ML models 132 may have multiple layers that perform various functions, such as statistical modeling (e.g., hidden Markov models (HMMs)), and utilize deep learning techniques (e.g., long short term memory (LSTM) deep learning, encoding of previous hidden states, etc.) to perform the desired functionality.

Hyper-automation system 100 may provide four main groups of functionality in some embodiments: (1) discovery; (2) building automations; (3) management; and (4) engagement. Automations (e.g., run on a user computing system, a server, etc.) may be run by software robots, such as RPA robots, in some embodiments. For instance, attended robots, unattended robots, and/or test robots may be used. Attended robots work with users to assist them with tasks (e.g., via UiPath Assistant™). Unattended robots work independently of users and may run in the background, potentially without user knowledge. Test robots are unattended robots that run test cases against applications or RPA workflows. Test robots may be run on multiple computing systems in parallel in some embodiments.

The discovery functionality may discover and provide automatic recommendations for different opportunities of automations of business processes. Such functionality may be implemented by one or more servers, such as server 130. The discovery functionality may include providing an automation hub, process mining, task mining, and/or task capture in some embodiments. The automation hub (e.g., UiPath Automation Hub™) may provide a mechanism for managing automation rollout with visibility and control. Automation ideas may be crowdsourced from employees via a submission form, for example. Feasibility and return on investment (ROI) calculations for automating these ideas may be provided, documentation for future automations may be collected, and collaboration may be provided to get from automation discovery to build-out faster.

Process mining (e.g., via UiPath Automation Cloud™ and/or UiPath AI Center™) refers to the process of gathering and analyzing the data from applications (e.g., enterprise resource planning (ERP) applications, customer relation management (CRM) applications, email applications, call center applications, etc.) to identify what end-to-end processes exist in an organization and how to automate them effectively, as well as indicate what the impact of the automation will be. This data may be gleaned from user computing systems 102, 104, 106 by listeners, for example, and processed by servers, such as server 130. One or more AI/ML models 132 may be employed for this purpose in some embodiments. This information may be exported to the automation hub to speed up implementation and avoid manual information transfer. The goal of process mining may be to increase business value by automating processes within an organization. Some examples of process mining goals include, but are not limited to, increasing profit, improving customer satisfaction, regulatory and/or contractual compliance, improving employee efficiency, etc.

Task mining (e.g., via UiPath Automation Cloud™ and/or UiPath AI Center™) identifies and aggregates workflows (e.g., employee workflows), and then applies AI to expose patterns and variations in day-to-day tasks, scoring such tasks for ease of automation and potential savings (e.g., time and/or cost savings). One or more AI/ML models 132 may be employed to uncover recurring task patterns in the data. Repetitive tasks that are ripe for automation may then be identified. This information may initially be provided by listeners and analyzed on servers of core hyper-automation system 120, such as server 130, in some embodiments. The findings from task mining (e.g., Extensible Application Markup Language (XAML) process data) may be exported to process documents or to a designer application such as UiPath Studio™ to create and deploy automations more rapidly. Task mining in some embodiments may include taking screenshots with user actions (e.g., mouse click locations, keyboard inputs, application windows and graphical elements the user was interacting with, timestamps for the interactions, etc.), collecting statistical data (e.g., execution time, number of actions, text entries, etc.), editing and annotating screenshots, specifying types of actions to be recorded, etc.

Task capture (e.g., via UiPath Automation Cloud™ and/or UiPath AI Center™) automatically documents attended processes as users work or provides a framework for unattended processes. Such documentation may include desired tasks to automate in the form of process definition documents (PDDs), skeletal workflows, capturing actions for each part of a process, recording user actions and automatically generating a comprehensive workflow diagram including the details about each step, Microsoft Word® documents, XAML files, and the like. Build-ready workflows may be exported directly to a designer application in some embodiments, such as UiPath Studio™. Task capture may simplify the requirements gathering process for both subject matter experts explaining a process and CoE members providing production-grade automations.

Building automations may be accomplished via a designer application (e.g., UiPath Studio™, UiPath StudioX™, or UiPath Web™). For instance, RPA developers of an RPA development facility 150 may use RPA designer applications 154 of computing systems 152 to build and test automations for various applications and environments, such as web, mobile, SAP®, and virtualized desktops. API integration may be provided for various applications, technologies, and platforms. Predefined activities, drag-and-drop modeling, and a workflow recorder, may make automation easier with minimal coding. Document understanding functionality may be provided via drag-and-drop AI skills for data extraction and interpretation that call one or more AI/ML models 132. Such automations may process virtually any document type and format, including tables, checkboxes, signatures, and handwriting. When data is validated or exceptions are handled, this information may be used to retrain the respective AI/ML models, improving their accuracy over time.

RPA designer application 152 may be designed to call one or more of trained AI/ML models 132 on server 130 and/or generative AI models 172 in a cloud environment via network 120 (e.g., a local area network (LAN), a mobile communications network, a satellite communications network, the Internet, any combination thereof, etc.) to assist with the RPA automation development process. In some embodiments, one or more of the AI/ML models may be packaged with RPA designer application 152 or otherwise stored locally on computing system 150.

In some embodiments, RPA designer application 152 and one or more of AI/ML models 132 may be configured to use an object repository stored in database 140. The object repository may include libraries of UI objects that can be used to develop RPA workflows via RPA designer application 152. The object repository may be used to add UI descriptors to activities in the workflows of RPA designer application 152 for UI automations. In some embodiments, one or more of AI/ML models 132 may generate new UI descriptors and add them to the object repository in database 140. Once automations are completed in designer application 152, they may be published on server 130, pushed out to computing systems 102, 104, 106, etc.

An integration service may allow developers to seamlessly combine user interface (UI) automation with API automation, for example. Automations may be built that require APIs or traverse both API and non-API applications and systems. A repository (e.g., UiPath Object Repository™) or marketplace (e.g., UiPath Marketplace™) for pre-built RPA and AI templates and solutions may be provided to allow developers to automate a wide variety of processes more quickly. Thus, when building automations, hyper-automation system 100 may provide user interfaces, development environments, API integration, pre-built and/or custom-built AI/ML models, development templates, integrated development environments (IDEs), and advanced AI capabilities. Hyper-automation system 100 enables development, deployment, management, configuration, monitoring, debugging, and maintenance of RPA robots in some embodiments, which may provide automations for hyper-automation system 100.

In some embodiments, components of hyper-automation system 100, such as designer application(s) and/or an external rules engine, provide support for managing and enforcing governance policies for controlling various functionality provided by hyper-automation system 100. Governance is the ability for organizations to put policies in place to prevent users from developing automations (e.g., RPA robots) capable of taking actions that may harm the organization, such as violating the E.U. General Data Protection Regulation (GDPR), the U.S. Health Insurance Portability and Accountability Act (HIPAA), third party application terms of service, etc. Since developers may otherwise create automations that violate privacy laws, terms of service, etc. while performing their automations, some embodiments implement access control and governance restrictions at the robot and/or robot design application level. This may provide an added level of security and compliance into the automation process development pipeline in some embodiments by preventing developers from taking dependencies on unapproved software libraries that may either introduce security risks or work in a way that violates policies, regulations, privacy laws, and/or privacy policies.

The management functionality may provide management, deployment, and optimization of automations across an organization. The management functionality may include orchestration, test management, AI functionality, and/or insights in some embodiments. Management functionality of hyper-automation system 100 may also act as an integration point with third-party solutions and applications for automation applications and/or RPA robots. The management capabilities of hyper-automation system 100 may include, but are not limited to, facilitating provisioning, deployment, configuration, queuing, monitoring, logging, and interconnectivity of RPA robots, among other things.

A conductor application, such as UiPath Orchestrator™ (which may be provided as part of the UiPath Automation Cloud™ in some embodiments, or on premises, in VMs, in a private or public cloud, in a Linux™ VM, or as a cloud native single container suite via UiPath Automation Suite™), provides orchestration capabilities to deploy, monitor, optimize, scale, and ensure security of RPA robot deployments. A test suite (e.g., UiPath Test Suite™) may provide test management to monitor the quality of deployed automations. The test suite may facilitate test planning and execution, meeting of requirements, and defect traceability. The test suite may include comprehensive test reporting.

Analytics software (e.g., UiPath Insights™) may track, measure, and manage the performance of deployed automations. The analytics software may align automation operations with specific key performance indicators (KPIs) and strategic outcomes for an organization. The analytics software may present results in a dashboard format for better understanding by human users.

A data service (e.g., UiPath Data Service™) may be stored in database 140, for example, and bring data into a single, scalable, secure place with a drag-and-drop storage interface. Some embodiments may provide low-code or no-code data modeling and storage to automations while ensuring seamless access, enterprise-grade security, and scalability of the data. AI functionality may be provided by an AI center (e.g., UiPath AI Center™), which facilitates incorporation of AI/ML models into automations. Pre-built AI/ML models, model templates, and various deployment options may make such functionality accessible even to those who are not data scientists. Deployed automations (e.g., RPA robots) may call AI/ML models from the AI center, such as AI/ML models 132. Performance of the AI/ML models may be monitored, and be trained and improved using human-validated data, such as that provided by data review center 160. Human reviewers may provide labeled data to core hyper-automation system 120 via a review application 152 on computing systems 154. For instance, human reviewers may validate that predictions by AI/ML models 132 are accurate or provide corrections otherwise. This dynamic input may then be saved as training data for retraining AI/ML models 132, and may be stored in a database such as database 140, for example. The AI center may then schedule and execute training jobs to train the new versions of the AI/ML models using the training data. Both positive and negative examples may be stored and used for retraining of AI/ML models 132.

The engagement functionality engages humans and automations as one team for seamless collaboration on desired processes. Low-code applications may be built (e.g., via UiPath Apps™) to connect browser tabs and legacy software, even that lacking APIs in some embodiments. Applications may be created quickly using a web browser through a rich library of drag-and-drop controls, for instance. An application can be connected to a single automation or multiple automations.

An action center (e.g., UiPath Action Center™) provides a straightforward and efficient mechanism to hand off processes from automations to humans, and vice versa. Humans may provide approvals or escalations, make exceptions, etc. The automation may then perform the automatic functionality of a given workflow.

A local assistant may be provided as a launchpad for users to launch automations (e.g., UiPath Assistant™). This functionality may be provided in a tray provided by an operating system, for example, and may allow users to interact with RPA robots and RPA robot-powered applications on their computing systems. An interface may list automations approved for a given user and allow the user to run them. These may include ready-to-go automations from an automation marketplace, an internal automation store in an automation hub, etc. When automations run, they may run as a local instance in parallel with other processes on the computing system so users can use the computing system while the automation performs its actions. In certain embodiments, the assistant is integrated with the task capture functionality such that users can document their soon-to-be-automated processes from the assistant launchpad.

Chatbots (e.g., UiPath Chatbots™), social messaging applications, and/or voice commands may enable users to run automations. This may simplify access to information, tools, and resources users need in order to interact with customers or perform other activities. Conversations between people may be readily automated, as with other processes. Trigger RPA robots kicked off in this manner may perform operations such as checking an order status, posting data in a CRM, etc., potentially using plain language commands.

End-to-end measurement and government of an automation program at any scale may be provided by hyper-automation system 100 in some embodiments. Per the above, analytics may be employed to understand the performance of automations (e.g., via UiPath Insights™). Data modeling and analytics using any combination of available business metrics and operational insights may be used for various automated processes. Custom-designed and pre-built dashboards allow data to be visualized across desired metrics, new analytical insights to be discovered, performance indicators to be tracked, ROI to be discovered for automations, telemetry monitoring to be performed on user computing systems, errors and anomalies to be detected, and automations to be debugged. An automation management console (e.g., UiPath Automation Ops™) may be provided to manage automations throughout the automation lifecycle. An organization may govern how automations are built, what users can do with them, and which automations users can access.

Hyper-automation system 100 provides an iterative platform in some embodiments. Processes can be discovered, automations can be built, tested, and deployed, performance may be measured, use of the automations may readily be provided to users, feedback may be obtained, AI/ML models may be trained and retrained, and the process may repeat itself. This facilitates a more robust and effective suite of automations.

In some embodiments, generative AI models are used. Generative AI can generate various types of content, such as text, imagery, audio, and synthetic data. various types of generative AI models may be used, including, but not limited to, large language models (LLMs), generative adversarial networks (GANs), variational autoencoders (VAEs), transformers, etc. These models may be part of AI/ML models 132 hosted on server 130 in some embodiments. For instance, the generative AI models may be trained on a large corpus of textual information to perform semantic understanding, to understand the nature of what is present on a screen from text, and the like. In certain embodiments, generative AI models 172 provided by an existing cloud ML service provider, such as OpenAI®, Google®, Amazon®, Microsoft®, IBM®, Nvidia®, Facebook®, etc., may be employed and trained to provide such functionality. In generative AI embodiments where generative AI model(s) 172 are remotely hosted, server 130 can be configured to integrate with third-party APIs, which allow server 130 to send a request to generative AI model(s) 172 including the requisite input information and receive a response in return (e.g., sequences of user interactions, extracted common processes, generated RPA robots, recognized applications, screens, and/or UI elements, semantic matches of fields between application versions and/or screens, a classification of the type of the application on the screen, etc.). Such embodiments may provide a more advanced and sophisticated user experience, as well as provide access to state-of-the-art natural language processing (NLP) and other ML capabilities that these companies offer.

Figure 2:
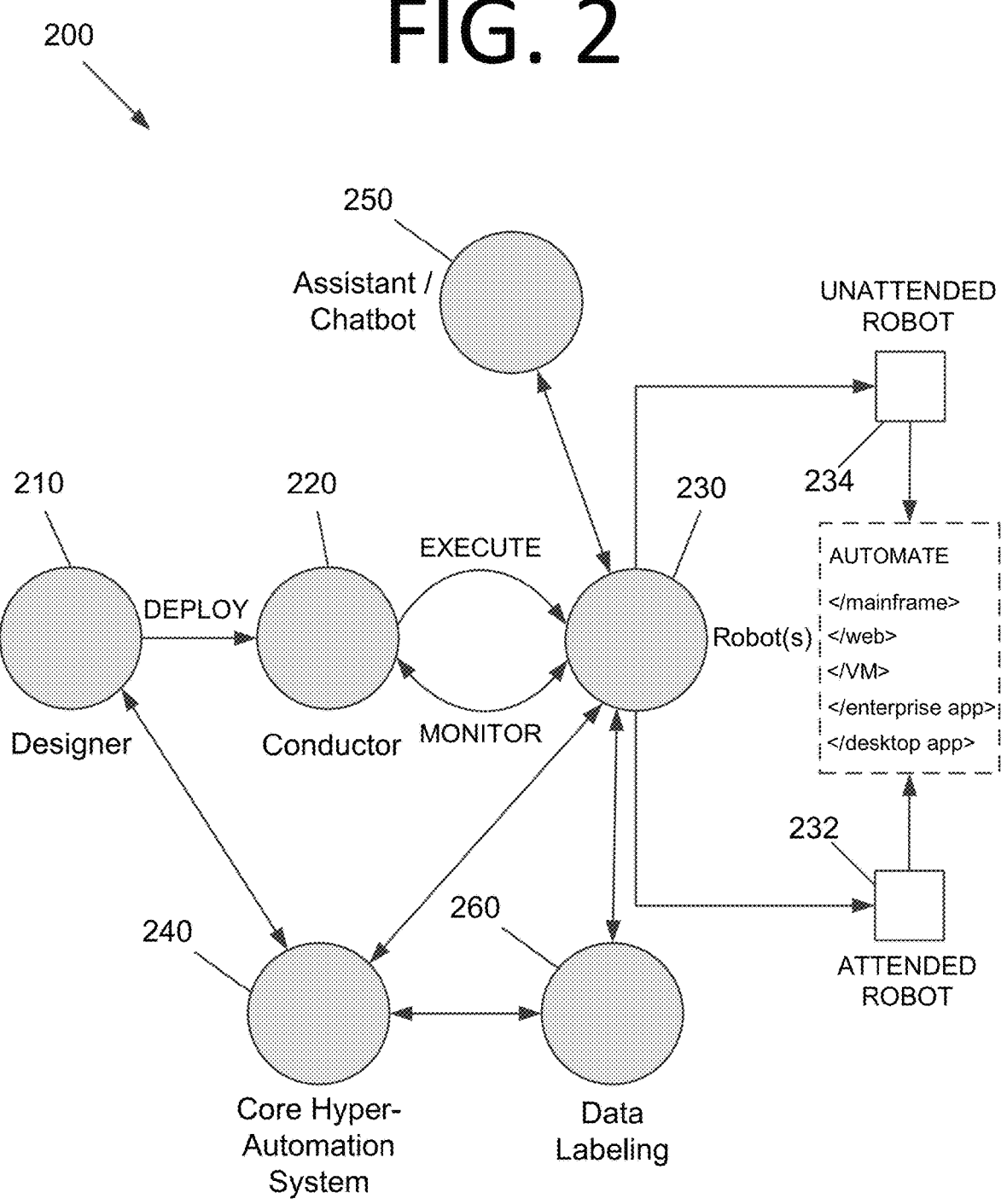
FIG. 2 is an architectural diagram illustrating an RPA system, according to an embodiment of the present invention.

FIG. 2 is an architectural diagram illustrating an RPA system 200, according to an embodiment of the present invention. In some embodiments, RPA system 200 is part of hyper-automation system 100 of FIG. 1. RPA system 200 includes a designer 210 that allows a developer to design and implement workflows. Designer 210 may provide a solution for application integration, as well as automating third-party applications, administrative Information Technology (IT) tasks, and business IT processes. Designer 210 may facilitate development of an automation project, which is a graphical representation of a business process. Simply put, designer 210 facilitates the development and deployment of workflows and robots. In some embodiments, designer 210 may be an application that runs on a user's desktop, an application that runs remotely in a VM, a web application, etc.

The automation project enables automation of rule-based processes by giving the developer control of the execution order and the relationship between a custom set of steps developed in a workflow, defined herein as "activities." One commercial example of an embodiment of designer 210 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, FSMs, and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 210, execution of business processes is orchestrated by conductor 220, which orchestrates one or more robots 230 that execute the workflows developed in designer 210. One commercial example of an embodiment of conductor 220 is UiPath Orchestrator™. Conductor 220 facilitates management of the creation, monitoring, and deployment of resources in an environment. Conductor 220 may act as an integration point with third-party solutions and applications. Per the above, in some embodiments, conductor 220 may be part of core hyper-automation system 120 of FIG. 1.

Conductor 220 may manage a fleet of robots 230, connecting and executing robots 230 from a centralized point. Types of robots 230 that may be managed include, but are not limited to, attended robots 232, unattended robots 234, development robots (similar to unattended robots 234, but used for development and testing purposes), and nonproduction robots (similar to attended robots 232, but used for development and testing purposes). Attended robots 232 are triggered by user events and operate alongside a human on the same computing system. Attended robots 232 may be used with conductor 220 for a centralized process deployment and logging medium. Attended robots 232 may help the human user accomplish various tasks, and may be triggered by user events. In some embodiments, processes cannot be started from conductor 220 on this type of robot and/or they cannot run under a locked screen. In certain embodiments, attended robots 232 can only be started from a robot tray or from a command prompt. Attended robots 232 should run under human supervision in some embodiments.

Unattended robots 234 run unattended in virtual environments and can automate many processes. Unattended robots 234 may be responsible for remote execution, monitoring, scheduling, and providing support for work queues. Debugging for all robot types may be run in designer 210 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 220 may have various capabilities including, but not limited to, provisioning, deployment, versioning, configuration, queueing, monitoring, logging, and/or providing interconnectivity. Provisioning may include creating and maintenance of connections between robots 230 and conductor 220 (e.g., a web application). Deployment may include assuring the correct delivery of package versions to assigned robots 230 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., a structured query language (SQL) database or a "not only" SQL (NoSQL) database) and/or another storage mechanism (e.g., ElasticSearch®, which provides the ability to store and quickly query large datasets). Conductor 220 may provide interconnectivity by acting as the centralized point of communication for third-party solutions and/or applications.

Robots 230 are execution agents that run workflows built in designer 210. One commercial example of some embodiments of robot(s) 230 is UiPath Robots™. In some embodiments, robots 230 install the Microsoft Windows® Service Control Manager (SCM)-managed service by default. As a result, such robots 230 can open interactive Windows® sessions under the local system account, and have the rights of a Windows® service.

In some embodiments, robots 230 can be installed in a user mode. For such robots 230, this means they have the same rights as the user under which a given robot 230 has been installed. This feature may also be available for High Density (HD) robots, which ensure full utilization of each machine at its maximum potential. In some embodiments, any type of robot 230 may be configured in an HD environment.

Robots 230 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 220 and the execution hosts (i.e., the computing systems on which robots 230 are executed). These services are trusted with and manage the credentials for robots 230. A console application is launched by the SCM under the local system.

User mode robot services in some embodiments manage and monitor Windows® sessions and act as a proxy between conductor 220 and the execution hosts. User mode robot services may be trusted with and manage the credentials for robots 230. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 230 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 210 may also be independent of browser zoom level in some embodiments. For applications that are DPI-unaware or intentionally marked as unaware, DPI may be disabled in some embodiments.

RPA system 200 in this embodiment is part of a hyper-automation system. Developers may use designer 210 to build and test RPA robots that utilize AI/ML models deployed in core hyper-automation system 240 (e.g., as part of an AI center thereof). Such RPA robots may send input for execution of the AI/ML model(s) and receive output therefrom via core hyper-automation system 240.

One or more of robots 230 may be listeners, as described above. These listeners may provide information to core hyper-automation system 240 regarding what users are doing when they use their computing systems. This information may then be used by core hyper-automation system for process mining, task mining, task capture, etc.

An assistant/chatbot 250 may be provided on user computing systems to allow users to launch RPA local robots. The assistant may be located in a system tray, for example. Chatbots may have a user interface so users can see text in the chatbot. Alternatively, chatbots may lack a user interface and run in the background, listening using the computing system's microphone for user speech.

In some embodiments, data labeling may be performed by a user of the computing system on which a robot is executing or on another computing system that the robot provides information to. For instance, if a robot calls an AI/ML model that performs CV on images for VM users, but the AI/ML model does not correctly identify a button on the screen, the user may draw a rectangle around the misidentified or non-identified component and potentially provide text with a correct identification. This information may be provided to core hyper-automation system 240 and then used later for training a new version of the AI/ML model.

Figure 3:
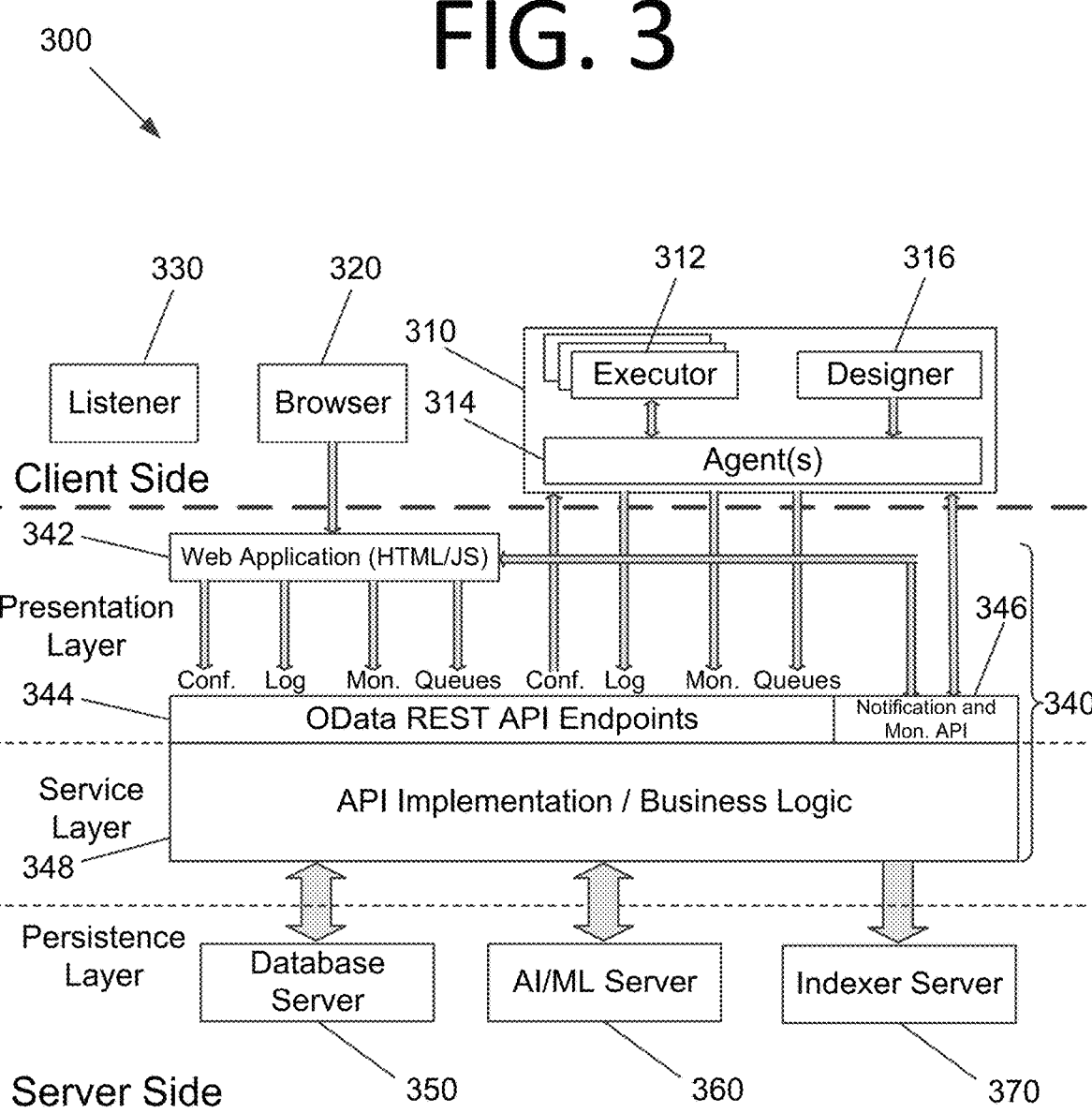
FIG. 3 is an architectural diagram illustrating a deployed RPA system, according to an embodiment of the present invention.

FIG. 3 is an architectural diagram illustrating a deployed RPA system 300, according to an embodiment of the present invention. In some embodiments, RPA system 300 may be, or may be a part of, RPA system 200 of FIG. 2 and/or hyper-automation system 100 of FIG. 1. Deployed RPA system 300 may be a cloud-based system, an on-premises system, a desktop-based system that offers enterprise level, user level, or device level automation solutions for automation of different computing processes, etc.

It should be noted that the client side, the server side, or both, may include any desired number of computing systems without deviating from the scope of the invention. On the client side, a robot application 310 includes executors 312, an agent 314, and a designer 316. However, in some embodiments, designer 316 may not be running on the same computing system 310 as executors 312 and agent 314. Executors 312 are running processes. Several business projects may run simultaneously, as shown in FIG. 3. Agent 314 (e.g., a Windows® service) is the single point of contact for all executors 312 in this embodiment. All messages in this embodiment are logged into conductor 340, which processes them further via a database server 350, an AI/ML server 360, an indexer server 370, or any combination thereof. As discussed above with respect to FIG. 2, executors 312 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 314 is also responsible for sending the status of the robot (e.g., periodically sending a "heartbeat" message indicating that the robot is still functioning) and downloading the required version of the package to be executed. The communication between agent 314 and conductor 340 is always initiated by agent 314 in some embodiments. In the notification scenario, agent 314 may open a WebSocket channel that is later used by conductor 340 to send commands to the robot (e.g., start, stop, etc.).

A listener 330 monitors and records data pertaining to user interactions with an attended computing system and/or operations of an unattended computing system on which listener 330 resides. Listener 330 may be an RPA robot, part of an operating system, a downloadable application for the respective computing system, or any other software and/or hardware without deviating from the scope of the invention. Indeed, in some embodiments, the logic of the listener is implemented partially or completely via physical hardware.

On the server side, a presentation layer (web application 342, Open Data Protocol (OData) Representative State Transfer (REST) API endpoints 344, and notification and monitoring 346), a service layer (API implementation/business logic 348), and a persistence layer (database server 350, AI/ML server 360, and indexer server 370) are included. Conductor 340 includes web application 342, OData REST API endpoints 344, notification and monitoring 346, and API implementation/business logic 348. In some embodiments, most actions that a user performs in the interface of conductor 340 (e.g., via browser 320) are performed by calling various APIs. Such actions may include, but are not limited to, starting jobs on robots, adding/removing data in queues, scheduling jobs to run unattended, etc. without deviating from the scope of the invention. Web application 342 is the visual layer of the server platform. In this embodiment, web application 342 uses Hypertext Markup Language (HTML) and JavaScript (JS). However, any desired markup languages, script languages, or any other formats may be used without deviating from the scope of the invention. The user interacts with web pages from web application 342 via browser 320 in this embodiment in order to perform various actions to control conductor 340. For instance, the user may create robot groups, assign packages to the robots, analyze logs per robot and/or per process, start and stop robots, etc.

In addition to web application 342, conductor 340 also includes service layer that exposes OData REST API endpoints 344. However, other endpoints may be included without deviating from the scope of the invention. The REST API is consumed by both web application 342 and agent 314. Agent 314 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 340. Queueing REST endpoints may be responsible for queues and queue item management, such as adding data to a queue, obtaining a transaction from the queue, setting the status of a transaction, etc.

Monitoring REST endpoints may monitor web application 342 and agent 314. Notification and monitoring API 346 may be REST endpoints that are used for registering agent 314, delivering configuration settings to agent 314, and for sending/receiving notifications from the server and agent 314. Notification and monitoring API 346 may also use WebSocket communication in some embodiments.

The APIs in the service layer may be accessed through configuration of an appropriate API access path in some embodiments, e.g., based on whether conductor 340 and an overall hyper-automation system have an on-premises deployment type or a cloud-based deployment type. APIs for conductor 340 may provide custom methods for querying stats about various entities registered in conductor 340. Each logical resource may be an OData entity in some embodiments. In such an entity, components such as the robot, process, queue, etc., may have properties, relationships, and operations. APIs of conductor 340 may be consumed by web application 342 and/or agents 314 in two ways in some embodiments: by getting the API access information from conductor 340, or by registering an external application to use the OAuth flow.

The persistence layer includes a trio of servers in this embodiment—database server 350 (e.g., a SQL server), AI/ML server 360 (e.g., a server providing AI/ML model serving services, such as AI center functionality) and indexer server 370. Database server 350 in this embodiment stores the configurations of the robots, robot groups, associated processes, users, roles, schedules, etc. This information is managed through web application 342 in some embodiments. Database server 350 may manage queues and queue items. In some embodiments, database server 350 may store messages logged by the robots (in addition to or in lieu of indexer server 370). Database server 350 may also store process mining, task mining, and/or task capture-related data, received from listener 330 installed on the client side, for example. While no arrow is shown between listener 330 and database 350, it should be understood that listener 330 is able to communicate with database 350, and vice versa in some embodiments. This data may be stored in the form of PDDs, images, XAML files, etc. Listener 330 may be configured to intercept user actions, processes, tasks, and performance metrics on the respective computing system on which listener 330 resides. For example, listener 330 may record user actions (e.g., clicks, typed characters, locations, applications, active elements, times, etc.) on its respective computing system and then convert these into a suitable format to be provided to and stored in database server 350.

AI/ML server 360 facilitates incorporation of AI/ML models into automations. Pre-built AI/ML models, model templates, and various deployment options may make such functionality accessible even to those who are not data scientists. Deployed automations (e.g., RPA robots) may call AI/ML models from AI/ML server 360. Performance of the AI/ML models may be monitored, and be trained and improved using human-validated data. AI/ML server 360 may schedule and execute training jobs to train new versions of the AI/ML models.

AI/ML server 360 may store data pertaining to AI/ML models and ML packages for configuring various ML skills for a user at development time. An ML skill, as used herein, is a pre-built and trained ML model for a process, which may be used by an automation, for example. AI/ML server 360 may also store data pertaining to document understanding technologies and frameworks, algorithms and software packages for various AI/ML capabilities including, but not limited to, intent analysis, natural language processing (NLP), speech analysis, different types of AI/ML models, etc.

Indexer server 370, which is optional in some embodiments, stores and indexes the information logged by the robots. In certain embodiments, indexer server 370 may be disabled through configuration settings. In some embodiments, indexer server 370 uses ElasticSearch®, which is an open source project full-text search engine. Messages logged by robots (e.g., using activities like log message or write line) may be sent through the logging REST endpoint(s) to indexer server 370, where they are indexed for future utilization.

Figure 4:
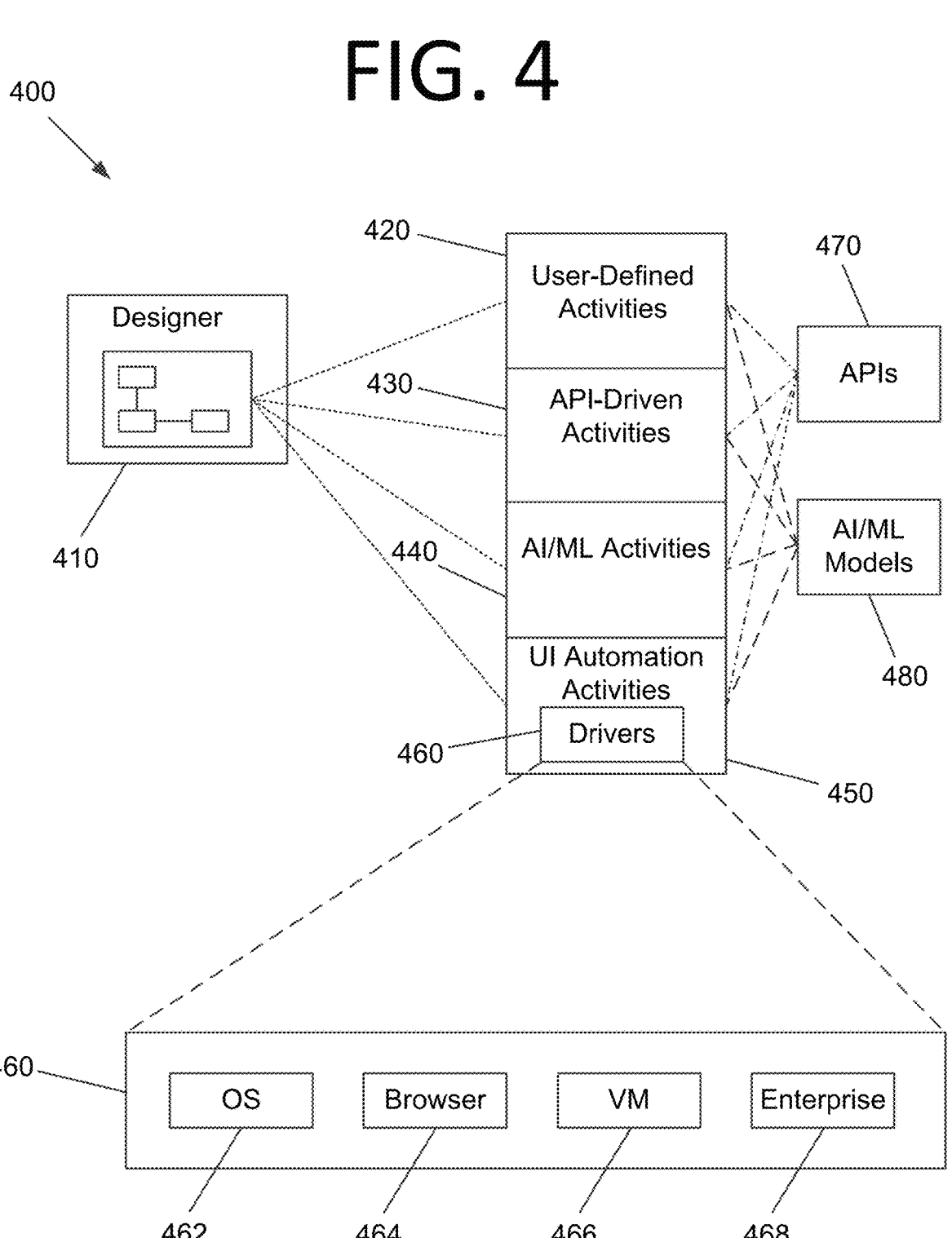
FIG. 4 is an architectural diagram illustrating the relationship between a designer, activities, and drivers, according to an embodiment of the present invention.

FIG. 4 is an architectural diagram illustrating the relationship 400 between a designer 410, activities 420, 430, 440, 450, drivers 460, APIs 470, and AI/ML models 480, according to an embodiment of the present invention. Per the above, a developer uses designer 410 to develop workflows that are executed by robots. The various types of activities may be displayed to the developer in some embodiments. Designer 410 may be local to the user's computing system or remote thereto (e.g., accessed via VM or a local web browser interacting with a remote web server). Workflows may include user-defined activities 420, API-driven activities 430, AI/ML activities 440, and/or and UI automation activities 450. User-defined activities 420 and API-driven activities 440 interact with applications via their APIs. User-defined activities 420 and/or AI/ML activities 440 may call one or more AI/ML models 480 in some embodiments, which may be located locally to the computing system on which the robot is operating and/or remotely thereto.

Some embodiments are able to identify non-textual visual components in an image, which is called CV herein. CV may be performed at least in part by AI/ML model(s) 480. Some CV activities pertaining to such components may include, but are not limited to, extracting of text from segmented label data using OCR, fuzzy text matching, cropping of segmented label data using ML, comparison of extracted text in label data with ground truth data, etc. In some embodiments, there may be hundreds or even thousands of activities that may be implemented in user-defined activities 420. However, any number and/or type of activities may be used without deviating from the scope of the invention.

UI automation activities 450 are a subset of special, lower-level activities that are written in lower-level code and facilitate interactions with the screen. UI automation activities 450 facilitate these interactions via drivers 460 that allow the robot to interact with the desired software. For instance, drivers 460 may include operating system (OS) drivers 462, browser drivers 464, VM drivers 466, enterprise application drivers 468, etc. One or more of AI/ML models 480 may be used by UI automation activities 450 in order to perform interactions with the computing system in some embodiments. In certain embodiments, AI/ML models 480 may augment drivers 460 or replace them completely. Indeed, in certain embodiments, drivers 460 are not included.

Drivers 460 may interact with the OS at a low level looking for hooks, monitoring for keys, etc. via OS drivers 462. Drivers 460 may facilitate integration with Chrome®, IE®, Citrix®, SAP®, etc. For instance, the "click" activity performs the same role in these different applications via drivers 460.

FIG. 5 is an architectural diagram illustrating a computing system 500 configured to determine sequences of user interactions with computing systems, extract common processes, and generate RPA robots using generative AI/ML models, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beam-steering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a generative AI/ML model training module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Various types of AI/ML models may be trained and deployed without deviating from the scope of the invention. For instance, FIG. 6A illustrates an example of a neural network 600 that has been trained to determine sequences of user interactions with computing systems, extract common processes, and generate RPA robots using generative AI, according to an embodiment of the present invention. Neural network 600 includes a number of hidden layers. Both deep learning neural networks (DLNNs) and shallow learning neural networks (SLNNs) usually have multiple layers, although SLNNs may only have one or two layers in some cases, and normally fewer than DLNNs. Typically, the neural network architecture includes an input layer, multiple intermediate layers, and an output layer, as is the case in neural network 600.

A DLNN often has many layers (e.g., 10, 50, 200, etc.) and subsequent layers typically reuse features from previous layers to compute more complex, general functions. A SLNN, on the other hand, tends to have only a few layers and train relatively quickly since expert features are created from raw data samples in advance. However, feature extraction is laborious. DLNNs, on the other hand, usually do not require expert features, but tend to take longer to train and have more layers.

For both approaches, the layers are trained simultaneously on the training set, normally checking for overfitting on an isolated cross-validation set. Both techniques can yield excellent results, and there is considerable enthusiasm for both approaches. The optimal size, shape, and quantity of individual layers varies depending on the problem that is addressed by the respective neural network.

Returning to FIG. 6A, screenshots, video frames, other information, recorded user interactions, etc. are provided as the input layer and fed as inputs to the J neurons of hidden layer 1. The other information may include, but is not limited to, web browser histories, heat maps, key presses, mouse clicks, locations of mouse clicks and/or graphical elements on the displays that users are interacting with, locations where the users were looking on the displays, time stamps associated with the screenshots and video frames, text that the users entered, content that the users scrolled past, times that the users stopped on parts of content shown in the displays, what applications the user were interacting with, voice inputs, gestures, emotion information, biometrics, information pertaining to periods of no user activity, haptic information, multi-touch input information, any combination thereof, etc. While all of these inputs are fed to each neuron in this example, various architectures are possible that may be used individually or in combination including, but not limited to, feed forward networks, radial basis networks, deep feed forward networks, deep convolutional inverse graphics networks, convolutional neural networks, recurrent neural networks, artificial neural networks, long/short term memory networks, gated recurrent unit networks, generative adversarial networks, liquid state machines, auto encoders, variational auto encoders, denoising auto encoders, sparse auto encoders, extreme learning machines, echo state networks, Markov chains, Hopfield networks, Boltzmann machines, restricted Boltzmann machines, deep residual networks, Kohonen networks, deep belief networks, deep convolutional networks, support vector machines, neural Turing machines, or any other suitable type or combination of neural networks without deviating from the scope of the invention.

Hidden layer 2 receives inputs from hidden layer 1, hidden layer 3 receives inputs from hidden layer 2, and so on for all hidden layers until the last hidden layer provides its outputs as inputs for the output layer. While multiple suggestions are shown here as output, in some embodiments, only a single output suggestion is provided. In certain embodiments, the suggestions are ranked based on confidence scores.

It should be noted that numbers of neurons I, J, K, and L are not necessarily equal. Thus, any desired number of layers may be used for a given layer of neural network 600 without deviating from the scope of the invention. Indeed, in certain embodiments, the types of neurons in a given layer may not all be the same.

Neural network 600 is trained to assign confidence score(s) to appropriate outputs. In order to reduce predictions that are inaccurate, only those results with a confidence score that meets or exceeds a confidence threshold may be provided in some embodiments. For instance, if the confidence threshold is 80%, outputs with confidence scores exceeding this amount may be used and the rest may be ignored.

It should be noted that neural networks are probabilistic constructs that typically have confidence score(s). This may be a score learned by the AI/ML model based on how often a similar input was correctly identified during training. Some common types of confidence scores include a decimal number between 0 and 1 (which can be interpreted as a confidence percentage as well), a number between negative $\infty$ and positive $\infty$, a set of expressions (e.g., "low," "medium," and "high"), etc. Various post-processing calibration techniques may also be employed in an attempt to obtain a more accurate confidence score, such as temperature scaling, batch normalization, weight decay, negative log likelihood (NLL), etc.

"Neurons" in a neural network are implemented algorithmically as mathematical functions that are typically based on the functioning of a biological neuron. Neurons receive weighted input and have a summation and an activation function that governs whether they pass output to the next layer. This activation function may be a nonlinear thresholded activity function where nothing happens if the value is below a threshold, but then the function linearly responds above the threshold (i.e., a rectified linear unit (ReLU) nonlinearity). Summation functions and ReLU functions are used in deep learning since real neurons can have approximately similar activity functions. Via linear transforms, information can be subtracted, added, etc. In essence, neurons act as gating functions that pass output to the next layer as governed by their underlying mathematical function. In some embodiments, different functions may be used for at least some neurons.

Figure 6B:
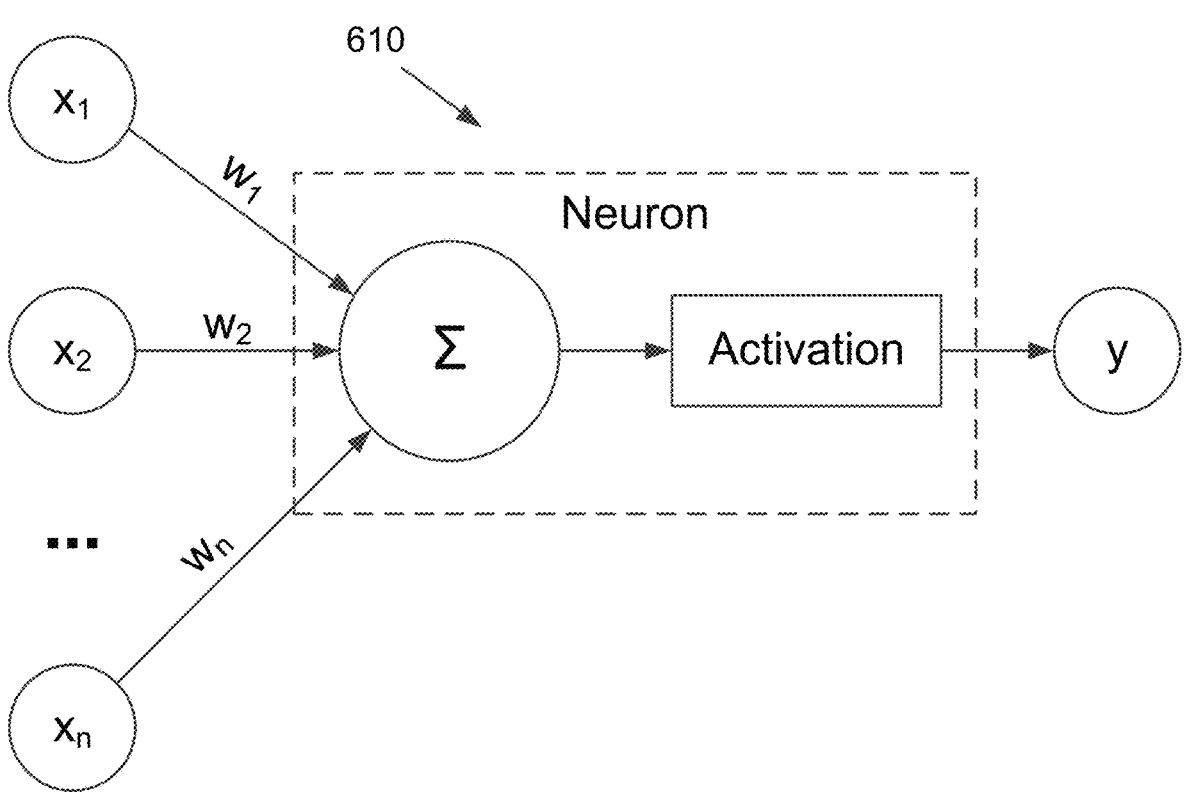
FIG. 6B illustrates an example of a neuron, according to an embodiment of the present invention.

An example of a neuron 610 is shown in FIG. 6B. Inputs $x_1, x_2, \ldots, x_n$ from a preceding layer are assigned respective weights $w_1, w_2, \ldots, w_n$. Thus, the collective input from preceding neuron 1 is $w_1 x_1$. These weighted inputs are used for the neuron's summation function modified by a bias, such as:

$$\sum_{i=1}^{m}(w_i x_i) + \text{bias} \tag{1}$$

This summation is compared against an activation function $f(x)$ to determine whether the neuron "fires". For instance, $f(x)$ may be given by:

$$f(x) = \begin{cases} 1 \text{ if } \sum wx + \text{bias} \geq 0 \\ 0 \text{ if } \sum wx + \text{bias} < 0 \end{cases} \tag{2}$$

The output y of neuron 610 may thus be given by:

$$y = f(x) \sum_{i=1}^{m} (w_i x_i) + \text{bias} \tag{3}$$

In this case, neuron 610 is a single-layer perceptron. However, any suitable neuron type or combination of neuron types may be used without deviating from the scope of the invention. It should also be noted that the ranges of values of the weights and/or the output value(s) of the activation function may differ in some embodiments without deviating from the scope of the invention.

A goal, or "reward function," is often employed. A reward function explores intermediate transitions and steps with both short-term and long-term rewards to guide the search of a state space and attempt to achieve a goal (e.g., finding the most accurate answers to user inquiries based on associated metrics). During training, various labeled data is fed through neural network 600. Successful identifications strengthen weights for inputs to neurons, whereas unsuccessful identifications weaken them. A cost function, such as mean square error (MSE) or gradient descent may be used to punish predictions that are slightly wrong much less than predictions that are very wrong. If the performance of the AI/ML model is not improving after a certain number of training iterations, a data scientist may modify the reward function, provide corrections of incorrect predictions, etc.

Per the above, backpropagation is a technique for optimizing synaptic weights in a feedforward neural network. Backpropagation may be used to "pop the hood" on the hidden layers of the neural network to see how much of the loss every node is responsible for, and subsequently updating the weights in such a way that minimizes the loss by giving the nodes with higher error rates lower weights, and vice versa. In other words, backpropagation allows data scientists to repeatedly adjust the weights so as to minimize the difference between actual output and desired output.

The backpropagation algorithm is mathematically founded in optimization theory. In supervised learning, training data with a known output is passed through the neural network and error is computed with a cost function from known target output, which gives the error for backpropagation. Error is computed at the output, and this error is transformed into corrections for network weights that will minimize the error.

In the case of supervised learning, an example of backpropagation is provided below. A column vector input x is processed through a series of N nonlinear activity functions $f_i$ between each layer i=1, . . . , N of the network, with the output at a given layer first multiplied by a synaptic matrix $W_i$, and with a bias vector $b_i$ added. The network output o, given by $$o = f_N(W_N f_{N-1}(W_{N-1} f_{N-2}( \ldots f_1(W_1 x + b_1) \ldots ) + b_{N-1}) + b_N) \tag{4}$$

In some embodiments, o is compared with a target output t, resulting in an error $$E = \frac{1}{2}\|o - t\|^2,$$

which is desired to be minimized.

Optimization in the form of a gradient descent procedure may be used to minimize the error by modifying the synaptic weights $W_i$ for each layer. The gradient descent procedure requires the computation of the output o given an input x corresponding to a known target output t, and producing an error o−t. This global error is then propagated backwards giving local errors for weight updates with computations similar to, but not exactly the same as, those used for forward propagation. In particular, the backpropagation step typically requires an activity function of the form $p_j(n_j)=f_j'(n_j)$, where $n_j$ is the network activity at layer j (i.e., $n_j = W_j o_{j-1} + b_j$) where $o_j = f_j(n_j)$ and the apostrophe ' denotes the derivative of the activity function $f$.

The weight updates may be computed via the formulae:

$$d_j = \begin{cases} (o - t) \circ p_j(n_j), & j = N \\ W_{j+1}^T d_{j+1} \circ p_j(n_j), & j < N \end{cases} \tag{5}$$

$$\frac{\partial E}{\partial W_{j+1}} = d_{j+1}(o_j)^T \tag{6}$$

$$\frac{\partial E}{\partial b_{j+1}} = d_{j+1} \tag{7}$$

$$W_j^{new} = W_j^{old} - \eta \frac{\partial E}{\partial W_j} \tag{8}$$

$$b_j^{new} = b_j^{old} - \eta \frac{\partial E}{\partial b_j} \tag{9}$$

where $\circ$ denotes a Hadamard product (i.e., the element-wise product of two vectors), $^T$ denotes the matrix transpose, and $o_j$ denotes $f_j(W_j o_{j-1} + b_j)$, with $o_0 = x$. Here, the learning rate $\eta$ is chosen with respect to machine learning considerations. Below, $\eta$ is related to the neural Hebbian learning mechanism used in the neural implementation. Note that the synapses W and b can be combined into one large synaptic matrix, where it is assumed that the input vector has appended ones, and extra columns representing the b synapses are subsumed to W.

The AI/ML model may be trained over multiple epochs until it reaches a good level of accuracy (e.g., 97% or better using an F2 or F4 threshold for detection and approximately 2,000 epochs). This accuracy level may be determined in some embodiments using an F1 score, an F2 score, an F4 score, or any other suitable technique without deviating from the scope of the invention. Once trained on the training data, the AI/ML model may be tested on a set of evaluation data that the AI/ML model has not encountered before. This helps to ensure that the AI/ML model is not "over fit" such that it performs well on the training data, but does not perform well on other data.

In some embodiments, it may not be known what accuracy level is possible for the AI/ML model to achieve. Accordingly, if the accuracy of the AI/ML model is starting to drop when analyzing the evaluation data (i.e., the model is performing well on the training data, but is starting to perform less well on the evaluation data), the AI/ML model may go through more epochs of training on the training data (and/or new training data). In some embodiments, the AI/ML model is only deployed if the accuracy reaches a certain level or if the accuracy of the trained AI/ML model is superior to an existing deployed AI/ML model. In certain embodiments, a collection of trained AI/ML models may be used to accomplish a task. For example, one model may be trained to suggest next activities or sequences of activities, another model may perform CV, yet another model may attempt runtime repair if the automation fails, etc.

Some embodiments may use transformer networks such as SentenceTransformers™, which is a Python™ framework for state-of-the-art sentence, text, and image embeddings. Such transformer networks learn associations of words and phrases that have both high scores and low scores. This trains the AI/ML model to determine what is close to the input and what is not, respectively. Rather than just using pairs of words/phrases, transformer networks may use the field length and field type, as well.

Natural language processing (NLP) techniques such as word2vec, BERT, GPT-3, ChatGPT, other LLMs, etc. may be used in some embodiments to facilitate semantic understanding and provide more accurate and human-like answers. Other techniques, such as clustering algorithms, may be used to find similarities between groups of elements. Clustering algorithms may include, but are not limited to, density-based algorithms, distribution-based algorithms, centroid-based algorithms, hierarchy-based algorithms. K-means clustering algorithms, the DBSCAN clustering algorithm, the Gaussian mixture model (GMM) algorithms, the balance iterative reducing and clustering using hierarchies (BIRCH) algorithm, etc. Such techniques may also assist with categorization.

FIG. 7 is a flowchart illustrating a process 700 for training AI/ML model(s), according to an embodiment of the present invention. In some embodiments, the AI/ML model(s) may be generative AI/ML models, per the above. The neural network architecture of AI/ML models typically includes multiple layers of neurons, including input, output, and hidden layers. See FIGS. 6A and 6B, for example. The input layer receives the input(s) and the output layer generates the response(s). The hidden layers in between process the input data and generate intermediate representations of the input that are used to generate the output. These hidden layers can include various types of neurons, such as convolutional neurons, recurrent neurons, and/or transformer neurons.

The training process begins with providing screenshots, video frames, other information, and/or recorded user interactions, whether labeled or unlabeled, at 710. The AI/ML model is then trained over multiple epochs at 720 and results are reviewed at 730. While various types of AI/ML models may be used, LLMs and other generative AI/ML models are typically trained using a process called "supervised learning", which is also discussed above. Supervised learning involves providing the model with a large dataset, which the model uses to learn the relationships between the inputs and outputs. During the training process, the model adjusts the weights and biases of the neurons in the neural network to minimize the difference between the predicted outputs and the actual outputs in the training dataset.

One aspect of the models in some embodiments is the use of transfer learning. For instance, transfer learning may take advantage of a pretrained model, such as ChatGPT, which is fine-tuned on a specific task or domain in step 720. This allows the model to leverage the knowledge already learned from the pretraining phase and adapt it to a specific application via the training phase of step 720.

The pretraining phase involves training the model on an initial set of training data that may be more general. During this phase, the model learns relationships in the data. In the fine-tuning phase (e.g., performed during step 720 in addition to or in lieu of the initial training phase in some embodiments if a pretrained model is used as the initial basis for the final model), the pretrained model is adapted to a specific task or domain by training the model on a smaller dataset that is specific to the task. For instance, in some embodiments, the model may be focused on UI automations and take advantage of an object repository. Fine-tuning allows the model to learn the nuances of the task, such as the specific vocabulary and syntax, certain graphical characteristics, certain data formats, etc., without requiring as much data as would be necessary to train the model from scratch. By leveraging the knowledge learned in the pretraining phase, the fine-tuned model can achieve state-of-the-art performance on specific tasks with relatively little additional training data.

If the AI/ML model fails to meet a desired confidence threshold at 740, the training data is supplemented and/or the reward function is modified to help the AI/ML model achieve its objectives better at 750 and the process returns to step 720. If the AI/ML model meets the confidence threshold at 740, the AI/ML model is tested on evaluation data at 760 to ensure that the AI/ML model generalizes well and that the AI/ML model is not over fit with respect to the training data. The evaluation data includes information that the AI/ML model has not processed before. If the confidence threshold is met at 770 for the evaluation data, the AI/ML model is deployed at 780. If not, the process returns to step 750 and the AI/ML model is trained further.

Figure 8:
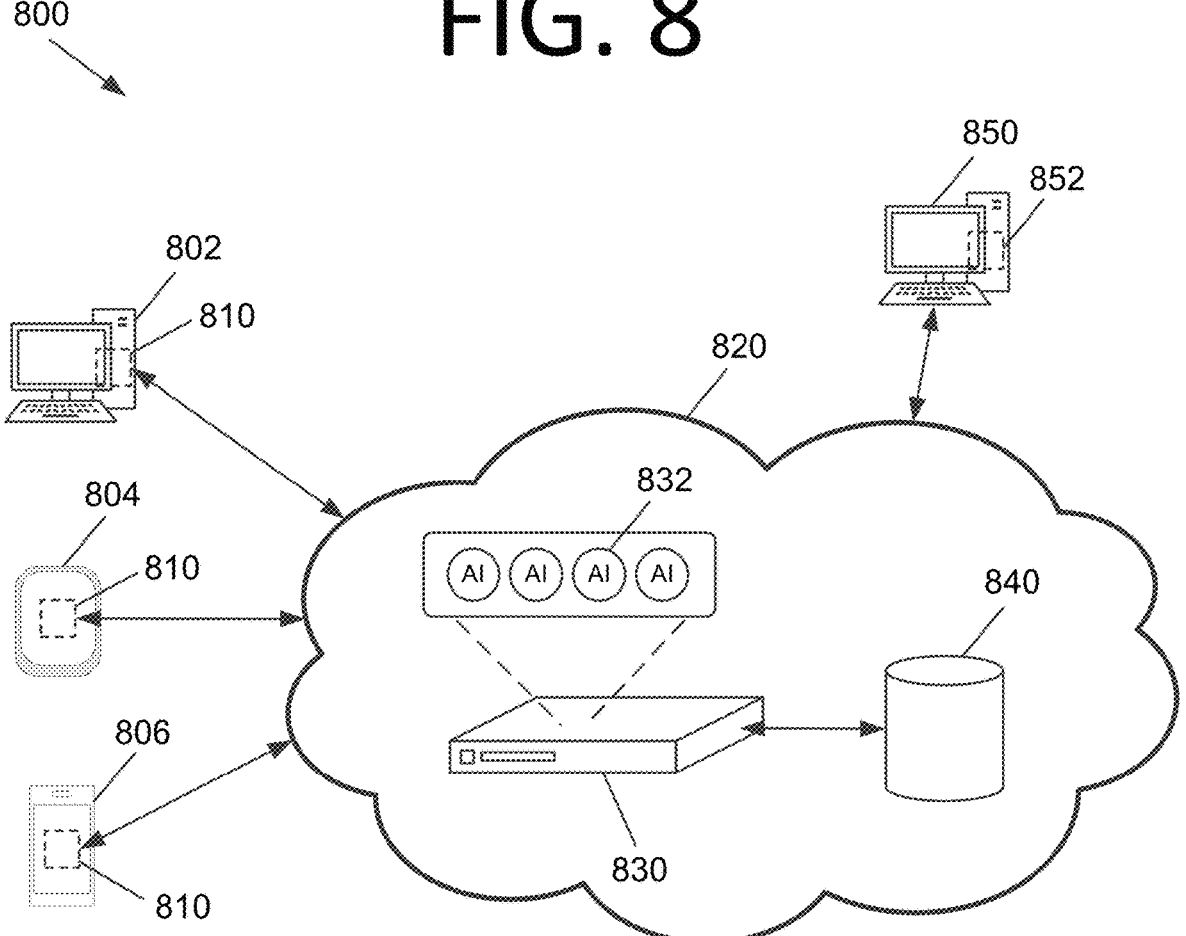
FIG. 8 is an architectural diagram illustrating a system configured to determine sequences of user interactions with computing systems, extract common processes, and generate RPA robots using generative AI/ML models, according to an embodiment of the present invention.

FIG. 8 is an architectural diagram illustrating a system 800 configured to determine sequences of user interactions with computing systems, extract common processes, and generate RPA robots using generative AI/ML models, according to an embodiment of the present invention. In some embodiments, system 800 may be part of hyperautomation system 100 of FIG. 1. System 800 includes user computing systems, such as desktop computer 802, tablet 804, and smart phone 806. However, any desired computing system may be used without deviating from the scope of invention including, but not limited to, smart watches, laptop computers, etc. Also, while three user computing systems are shown in FIG. 8, any suitable number of computing systems may be used without deviating from the scope of the invention. For instance, in some embodiments, dozens, hundreds, thousands, or millions of computing systems may be used.

Each computing system 802, 804, 806 has a recorder process 810 running thereon that records screenshots and/or video of the user's screen or a portion thereof. For instance, a snippet of JavaScript® may be embedded in a web browser as recorder process 810 to track what components the user interacts with, what text the user enters, what locations/components the user clicks with the mouse, what content the user scrolled past, how long the user stopped on a certain part of the content, etc. Scrolling past content may indicate that the content may have been somewhat close but did not have exactly what the user wanted. Clicks may indicate success.

Recorder processes 810 need not be JavaScript®, and may be any suitable type of application and in any desired programming language without deviating from the scope of the invention. This may allow "generalizing" of recorder processes 810 such that they can track user interactions with multiple applications or any application that the user is interacting with. Using labeled training data from scratch may be difficult since while it may allow the generative AI/ML model to learn to recognize various controls, it does not contain information regarding which controls are commonly used and how. Using recorder processes 810, a "heat map" could be generated to help bootstrap the AI/ML model training process. The heat map may include various information, such as the frequency that a user used applications, the frequency that the user interacted with components of the applications, the locations of the components, the content of the applications/components, etc. In some embodiments, the heat map may be derived from screen analysis, such as detection of typed and/or pasted text, caret tracking, and active element detection for computing systems 802, 804, 806. Some embodiments recognize where on the screen associated with computing systems 802, 804, 806 the user has been typing or pasting text, potentially including hot keys or other keys that do not cause visible characters to appear, and provide the physical position on the screen based on the current resolution (e.g., in coordinates) of where one or more characters appeared, where the cursor was blinking, or both. The physical position of the typing or pasting activity and/or of the caret may allow determination of which field(s) the user is typing in or focused on and what the application is for process discovery or other applications.

Per the above, in some embodiments, recorder processes 810 may record additional data to further assist in training AI/ML model(s), such as web browser history, heat maps, key presses, mouse clicks, locations of mouse clicks and/or graphical elements on the screen that the user is interacting with, locations where the user was looking on the screen at different times, time stamps associated with the screenshot/video frames, etc. This may be beneficial for providing key presses and/or other user actions that may not cause a screen change. For instance, some applications may not provide a visual change when the user presses CTRL+S to save a file. However, in certain embodiments, one or more generative AI/ML model(s) may be trained solely based on captured screen images. Recorder processes 810 may be robots generated via an RPA designer application, part of an operating system, a downloadable application for a personal computer (PC) or smart phone, or any other software and/or hardware without deviating from the scope of the invention. Indeed, in some embodiments, the logic of one or more of recorder processes 810 is implemented partially or completely via physical hardware.

Some embodiments are implemented in a feedback loop process that continuously or periodically compares the current screenshot to the previous screenshot to identify changes. Locations where visual changes occurred on the screen may be identified and OCR may be performed on the location where the change occurred. Results of the OCR may then be compared to the content of a keyboard queue (e.g., as determined by key hooking) to determine whether a match exists. The locations where the change occurred may be determined by comparing a box of pixels from the current screenshot to a box of pixels in the same location from a previous screenshot.

Images and/or other data (e.g., web browser history, heat maps, key presses, mouse clicks, locations of mouse clicks and/or graphical elements on the screen that the user is interacting with, locations where the user was looking on the screen at different times, time stamps associated with the screenshot/video frames, voice inputs, gestures, emotions (e.g., whether a user is happy, frustrated, etc.), biometrics (e.g., fingerprints, retinal scans, the user's pulse, etc.), information pertaining to periods of no user activity (e.g., "dead man switches"), haptic information from a haptic display or touch pad, a heat map with multi-touch inputs, etc.) that are recorded by recorder processes 810 are sent via a network 820 (e.g., a local area network (LAN), a mobile communications network, a satellite communications network, the Internet, any combination thereof, etc.) to a server 830. In some embodiments, server 830 may be part of a public cloud architecture, a private cloud architecture, a hybrid cloud architecture, etc. In certain embodiments, server 830 may host multiple software-based servers on a single computing system 830. In some embodiments, server 830 may run a conductor application and the data from recorder processes 810 may be sent periodically as part of the heartbeat message. In certain embodiments, the data may be sent from recorder processes 810 to server 830 once a predetermined amount of data has been collected, after a predetermined time period has elapsed, or both. Server 830 stores the received data from recorder processes 810 in a database 840.

Server 830 includes generative AI/ML models 832. In some embodiments, generative AI/ML models 832 may have multiple layers that perform various functions, such as statistical modeling (e.g., hidden Markov models (HMMs)), and utilize deep learning techniques (e.g., long short term memory (LSTM) deep learning, encoding of previous hidden states, etc.) to identify sequences of user interactions. Generative AI/ML models 832 may perform various tasks, such as extracting user interactions from recorder processes 810, determining sequences of the extracted user interactions, generating RPA robots, etc. In some embodiments, a generative AI/ML model for determining sequences of user interactions may be provided with the interactions that have been recognized by another generative AI/ML model, along with times that the user interactions occurred, locations on the screen, etc.

In some embodiments, generative AI/ML models 832 for recognizing sequences of tasks may be provided with user interactions that have already been recognized by another generative AI/ML model. However, in certain embodiments, generative AI/ML models 832 go through a training phase using data from the user interactions as input and a generative AI/ML model 832 are trained until generative AI/ML model 832 is sufficiently accurate, but not overfit to the training data. The accuracy that is acceptable may depend on the application. Identification errors can be highlighted by a human reviewer (e.g., by drawing a box around the misidentified element and including the correct identification), and generative AI/ML model 832 can be retrained using this additional labeled data. Once adequately trained, generative AI/ML model 832 is able to provide predictions as output, such as which application(s) and graphical element(s) are recognized as being present in a screen.

However, while this level of training provides information regarding what is present, further information may be needed to determine user interactions, such as comparing two or more consecutive screens to determine that a typed character appeared from one to another, a button was pressed, a menu selection occurred, etc. Thus, after generative AI/ML model 832 can recognize graphical elements and applications on the screen, in some embodiments, generative AI/ML model 832 is further trained to recognize labeled user interactions with the applications in the UI to understand such incremental actions taken by the user. Identification errors can again be highlighted by a human reviewer (e.g., by drawing a box around the misidentified element and including the correct identification), and generative AI/ML model 832 can be trained until its accuracy is sufficiently high to be deployed to understand granular user interactions with the UI.

Once trained to recognize user interactions in some embodiments, trained generative AI/ML model 832 may be used to analyze video, previously identified user interactions, and/or other information from recorder processes 810. This recorded information may include interactions that multiple/many users tend to perform. These interactions can then be analyzed for common sequences for subsequent automation.

Generative AI/ML model 832 (whether the same AI/ML model that identifies user interactions or a separate AI/ML model to be utilized for sequence recognition) needs to be trained to recognize sequences of interactions as tasks in some embodiments. This may be accomplished by applying n-grams of multiple sizes to search for matching sequences in the data. Generative AI/ML model 832 may be trained to use a range of sizes of n that tend to identify meaningful sequences (e.g., based on frequency, importance metric(s), etc.). In some embodiments, the n-grams are applied to the sequences of user interactions over a sliding window to identify matching sequences.

Generative AI/ML model 832 may also be trained to associate user interactions in the sequences with RPA activities. This may be accomplished by a human reviewer initially identifying the RPA activity for the given user interaction. Generative AI/ML model 832 may learn over time to anticipate activities for somewhat new interactions. For instance, if previous activities for a menu item involve finding a "Submit" button image on the screen, moving the mouse to be located over the area of the button, and clicking the button, generative AI/ML model 832 may learn to perform a similar process for an "OK" button, a "Next" button, etc.

After generative AI/ML model 832 can associate the interactions with the respective activities, generative AI/ML model 832 or another process may be trained to generate an RPA workflow with a sequence of activities accomplishing the task of the sequence of user interactions. The generated RPA workflow may then be used to generate and deploy an RPA robot or the workflow may be sent to an RPA developer for review, such as via an application 852 (e.g., an RPA designer application) of a computing system 850 that allows the RPA developer to view and modify the RPA workflow. In some embodiments, generative AI/ML model 832 may initially send the workflows to the RPA developer, and after the RPA developer has accepted a certain number of RPA workflows without modification, switch to automatically generating and deploying RPA robots implementing the workflow logic without human interaction.

In some embodiments, generative AI/ML model 832 may be trained to recognize sequences of user interactions that accomplish the same task, but are at least slightly different. Generative AI/ML model 832 may generate a probability graph that includes loose associations between the user interactions. The probability graph may then be "pruned" to determine which sequences are related. For instance, interactions may be removed and generative AI/ML model 832 may check whether the same task is accomplished. A Levenshtein distance, fuzzy matching, and/or any other suitable technique may be used to determine related sequences without deviating from the scope of the invention.

In some embodiments, generative AI/ML model 832 may be trained to determine the most efficient path among multiple related sequences. This may be determined based on the number of interactions/steps, the time associated with each step (e.g., as obtained from timestamps in the time-ordered data pertaining to the user interactions), etc. An RPA workflow may then be generated based on the most efficient sequence that accomplishes that task.

In some embodiments, generative AI/ML model 832 may be trained to recognize desirable outcomes without initially analyzing sequences of user interactions. For instance, generative AI/ML model 832 may be trained to recognize that an account was created, a new user was added, revenue was generated, a problem was resolved, etc. Generative AI/ML model 832 may then look backwards in the data pertaining to the user interactions or the user interactions themselves to recreate the sequence that lead to the desirable outcome. Generative AI/ML 832 model or another process could then associate the interactions with activities and generate an RPA workflow that implements the sequence.

Modern networks are essentially large probability graphs. Once a desirable outcome is determined, generative AI/ML model 832 may look backwards at the priors and rate what mattered the most to achieve the desired outcome in some embodiments. If it is determined that revenue increased as an outcome, the signal that lead to the outcome may be resolved into sub-signals, and it may be determined which sub-signal(s) lead to the revenue increase.

In some embodiments, sequences may not need to be recognized at all. For example, generative AI/ML model 832 may be trained to recognize and track associations between interactions and repetition thereof. If generative AI/ML model 832 is a neural network, for instance, based on an association graph, generative AI/ML model 832 may strengthen nodes in the neural network in order to tend to choose the interactions that lead to the desirable outcome.

Per the above, in some embodiments, AI can be used to perform the entire process end-to-end. For instance, generative AI/ML model(s) 832 may be used to determine which applications users are using, their graphical elements, and user interactions, determine common sequences of user interactions, and automatically build and deploy an RPA robot that implements the sequence of interactions at run-time without design time development. Training data may then be obtained from users of computing systems 802, 804, 806 regarding scenarios where the automatically developed robots do work or an anomaly is encountered, and this training data can be provided to server 830 and used to retrain generative AI/ML model 832. The training data may include regions in images where misidentifications occurred or elements were missed, label corrections, input corrections, etc. This process may be repeated to iteratively improve the RPA robots.

AI Layers

In some embodiments, multiple AI layers may be used. Each AI layer is an algorithm (or model) that runs on the data, and the AI model itself may be deep learning neural networks (DLNNs) of trained artificial "neurons" that are trained in training data. Layers may be run in series, in parallel, or a combination thereof.

The AI layers may include, but are not limited to, a sequence extraction layer, a clustering detection layer, a visual component detection layer, a text recognition layer (e.g., OCR), an audio-to-text translation layer, or any combination thereof. However, any desired number and type(s) of layers may be used without deviating from the scope of the invention. Using multiple layers may allow the system to develop a global picture of what is happening in the screens. For example, one AI layer could perform OCR, another could detect buttons, another could compare sequences, etc. Patterns may be determined individually by an AI layer or collectively by multiple AI layers.

Figure 9:
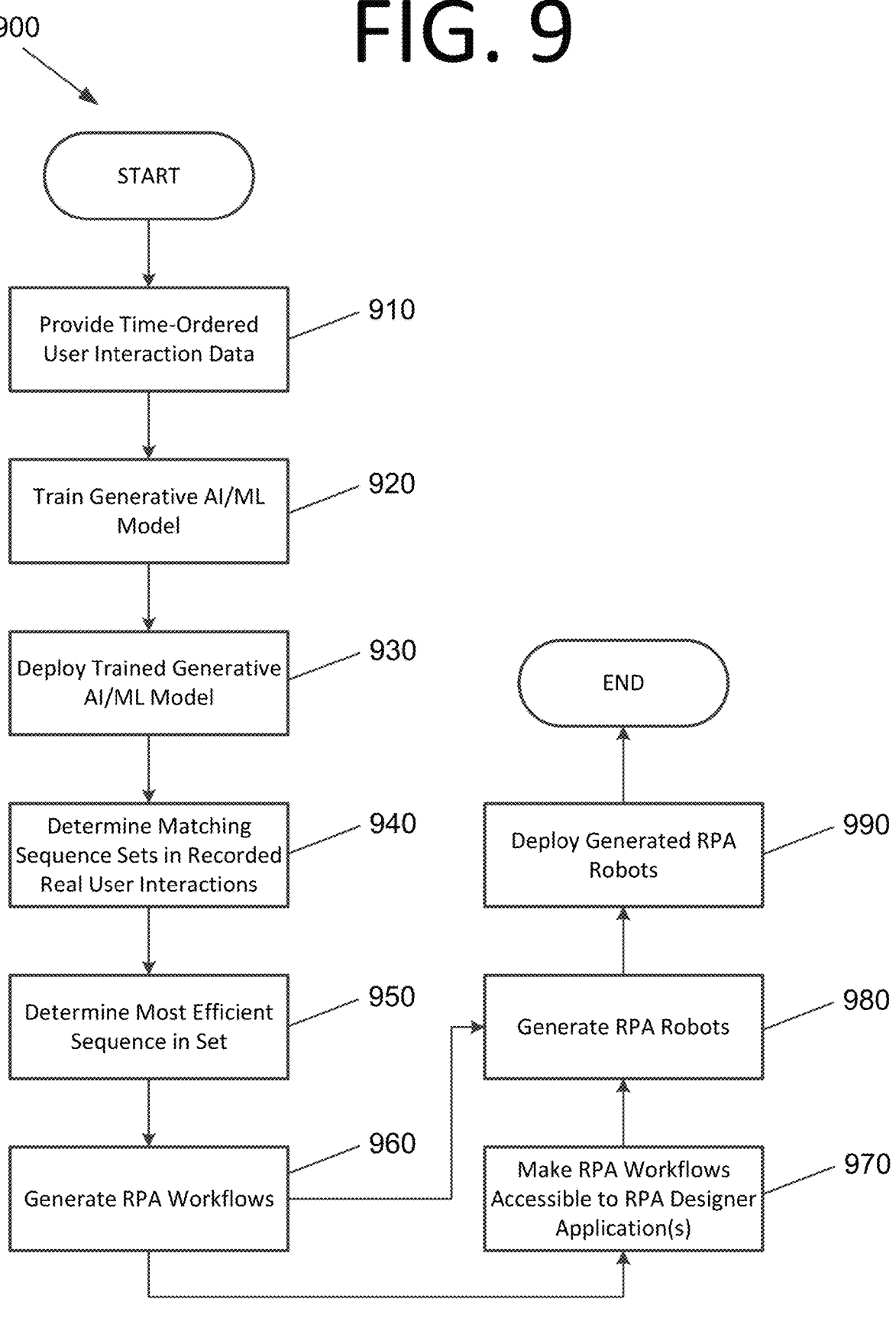
FIG. 9 is a flowchart illustrating a process for determining sequences of user interactions with computing systems, extracting common processes, and generating RPA robots using generative AI/ML models, according to an embodiment of the present invention.

FIG. 9 is a flowchart illustrating a process 900 for determining sequences of user interactions with computing systems, extracting common processes, and generating RPA robots using generative AI/ML models, according to an embodiment of the present invention. The process begins with providing a generative AI/ML model with data including time-ordered interactions of a plurality of users with respective user computing systems at 910. The generative AI/ML model is then trained to recognize related sequences in the data at 920. In some embodiments, the training includes training the generative AI/ML model to recognize related sequences of user interactions that pertain to tasks in the time-ordered sequences of user interactions by comparing n-grams of sequences of user interactions in recorded data from the computing systems over a sliding window to find the related sequences. The n-grams may include two or more values of n.

In some embodiments, the training includes training the generative AI/ML model to use one or more importance metrics when determining whether a task is found in the related sequences. In certain embodiments, the one or more importance metrics include whether a related sequence of actions generates at least a certain amount of revenue, saves at least a certain amount of revenue, increases efficiency and/or speed of a task by at least a certain amount, speeds up a customer acquisition process, reduces a number of communications that are required, or a combination thereof. In some embodiments, the training includes training the generative AI/ML model to determine a lowest value of n such that a majority of sequences of at least size n pertain to tasks performed by the users. In certain embodiments, the training includes training the generative AI/ML model to determine a highest value of n such that n-grams above the highest value of n are not considered. In some embodiments, the training includes training the generative AI/ML model or an RPA designer application to associate user interactions with RPA activities. In certain embodiments, a minimum number of related sequences is required for the generative AI/ML model to determine that the sequence pertains to a task.

The trained generative AI/ML model is then deployed at 930. In some embodiments, the deployed generative AI/ML model is configured to be called by one or more RPA robots. Recorded real user interactions of a plurality of users with respective computing systems are analyzed and sets of matching sequences in the recorded real user interactions are determined by the trained generative AI/ML model at 940. In some embodiments, the determining of the sets of matching sequences includes generating a probability graph including associations between sequences of user interactions, by the generative AI/ML model, pruning the probability graph to remove unrelated user interactions and sequences, by the generative AI/ML model, and determining that sequences of user interactions match as part of a set of the set of matching sequences based on the pruned probability graph, by the generative AI/ML model. In certain embodiments, the determination of whether the sequences match is performed using a Levenshtein distance, fuzzy matching, or a combination thereof.

A most efficient sequence of each set of matching sequences is determined at 950. In some embodiments, the determination of the most efficient sequence is based on a number of user interactions in the sequence, a time associated with user interactions in the sequence, or a combination thereof. RPA workflows implementing the most efficient sequences are then generated at 960. The RPA workflows include activities that implement user interactions of the sequences. In certain embodiments, the one or more generated RPA workflows are made accessible to one or more RPA designer applications at 970 so an RPA developer can edit the workflows, if desired. Additionally or alternatively, respective RPA robots are generated using the most efficient sequences at 980. In some embodiments, the generative AI/ML model performs steps 950, 960, 970, and/or 980. The one or more generated RPA robots may then be deployed to one or more user computing systems at 990.

Figure 10:
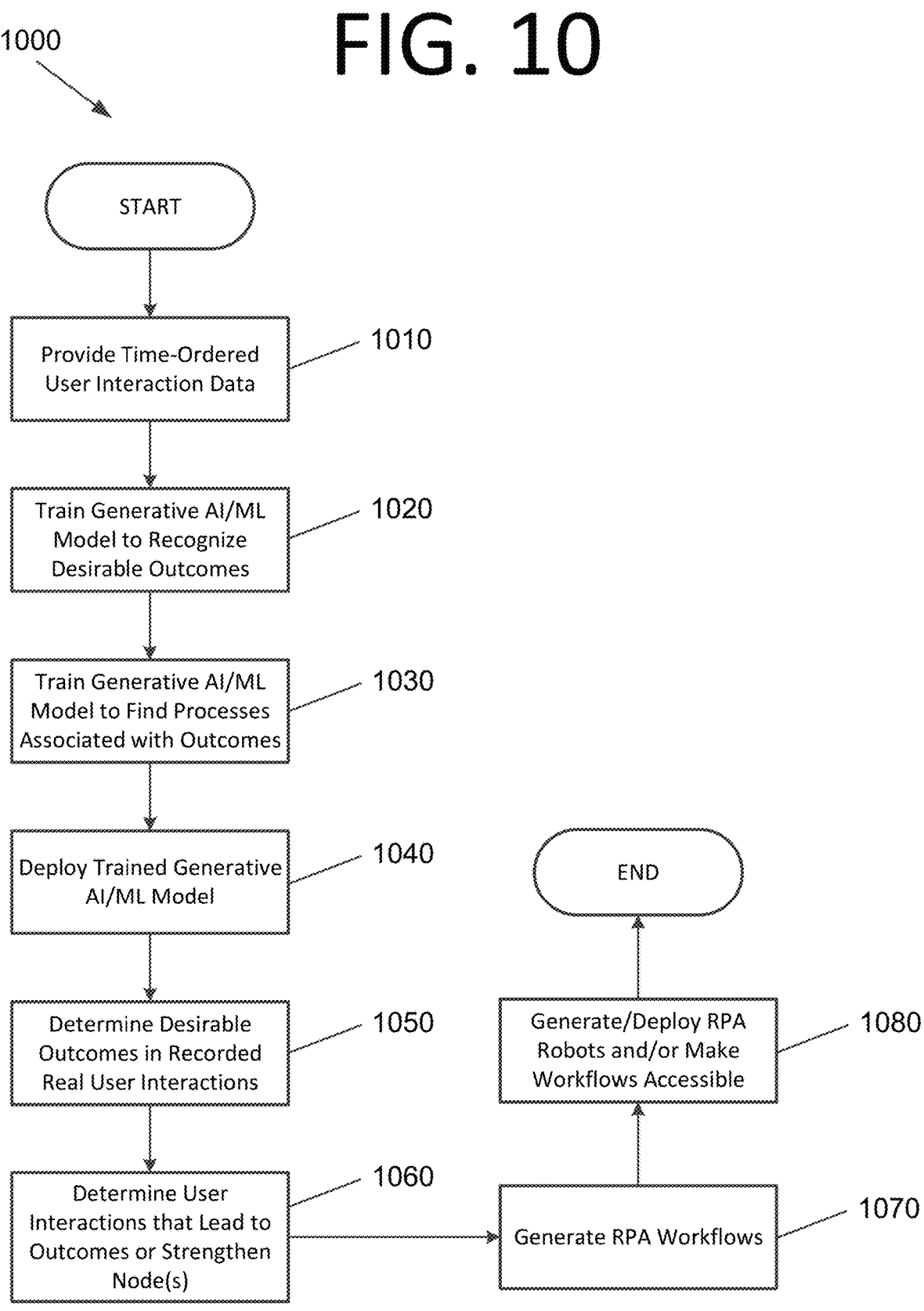
FIG. 10 is a flowchart illustrating a process for performing process extraction based on a desirable end state using generative AI/ML models and generating RPA robots, according to an embodiment of the present invention.

FIG. 10 is a flowchart illustrating a process 1000 for performing process extraction based on a desirable end state using generative AI/ML models and generating RPA robots, according to an embodiment of the present invention. The process begins with providing a generative AI/ML model with data including time-ordered interactions of a plurality of users with respective user computing systems at 1010. The generative AI/ML model is then trained to recognize desirable outcomes at 1020 and to determine the process(es) that lead to the desirable outcomes at 1030. For instance, the generative AI/ML model may be trained to recognize various desirable states, such as that an account was created, a new user was added, revenue was generated, a problem was resolved, etc. The generative AI/ML model may then look backwards in the data pertaining to the user interactions or the user interactions themselves to recreate the sequence that lead to the desirable outcome. In some embodiments, once a desirable outcome is determined, the generative AI/ML model may look backwards at the priors and rate what mattered the most to achieve the desired outcome. The signal that lead to the outcome may be resolved into sub-signals, and it may be determined which sub-signal(s) lead to the desirable. The generative AI/ML model is then deployed at 1040.

Desirable outcomes in recorded real user interaction data are then determined by the generative AI/ML model at 1050. The generative AI/ML model then determines the user interactions that lead to the desirable outcome (e.g., by trying time-ordered interactions before the desirable outcome was achieved to attempt to replicate the desirable outcome) or experiments with strengthening nodes in neural network priors until the desirable outcome can be replicated at 1060. RPA workflows leading to the desirable outcomes are then generated at 1070 (e.g., by adding activities associated with the user interactions to the RPA workflows, adding one or more activities that call one or more AI/ML models that have been trained to perform the task via backpropagation, etc.). In some embodiments, the generative AI/M model generates the RPA workflows. The one or more generated RPA workflows are made accessible to one or more RPA designer applications, respective RPA robots are generated/deployed, or both, at 1080.

Figure 11:
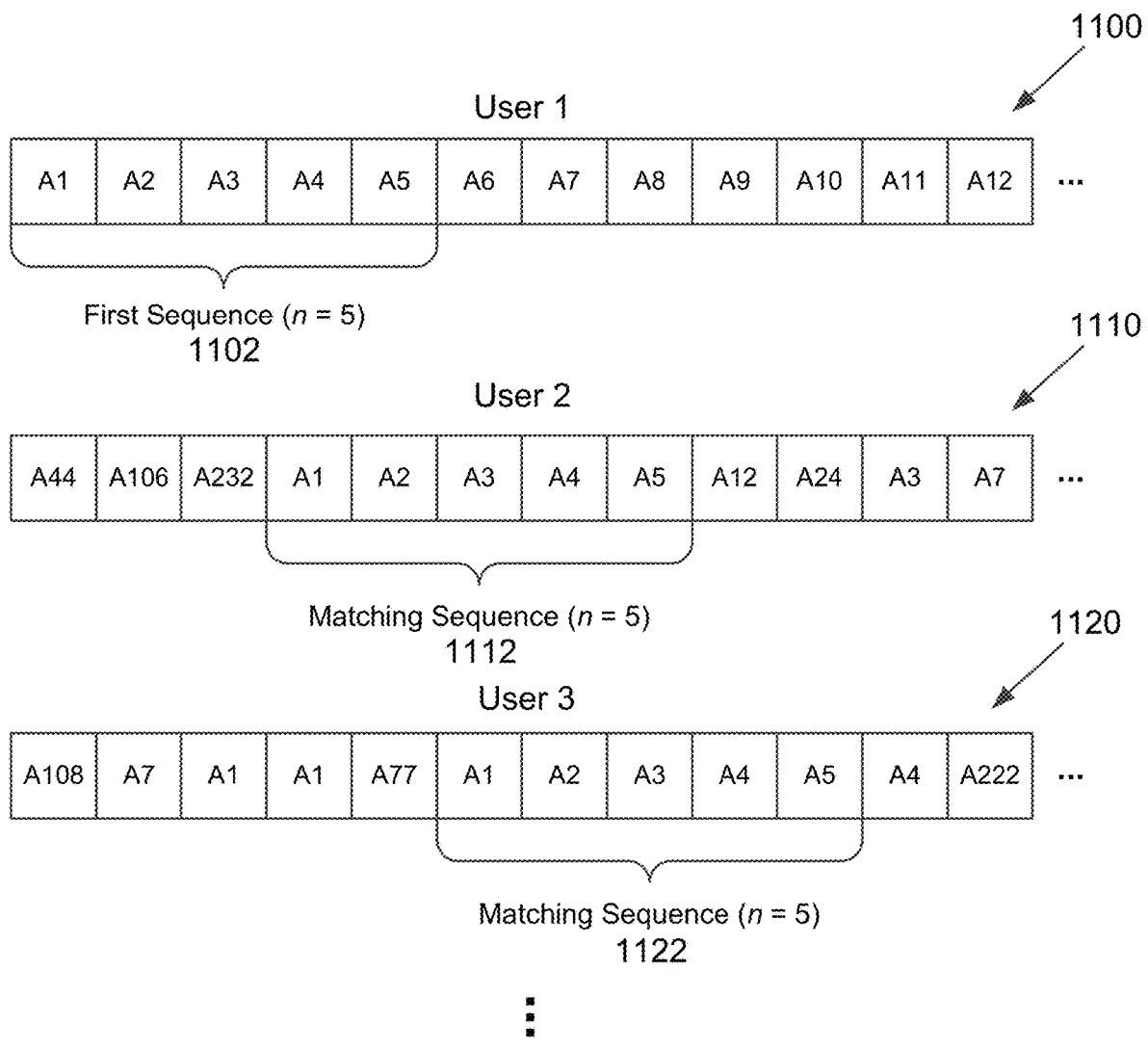
FIG. 11 illustrates comparisons of n-grams representing sequences of user interactions, according to an embodiment of the present invention.

FIG. 11 illustrates comparisons of n-grams representing sequences of user interactions, according to an embodiment of the present invention. In this example, sequence 1100 represents a time-ordered series of interactions for a first user, sequence 1110 represents a time-ordered series of interactions for a second user, and sequence 1120 represents a time-ordered series of interactions for a third user. Interactions of any number of users may be compared without deviating from the scope of the invention. Here, the n-gram size for comparison is 5.

Initially, a 5-gram 902 of the first five interactions of the first user (A1, A2, AA3, A4, A5) is compared to the time-ordered 5-grams in sequences 1110 and 1120. Any number of different interactions may be identified and compared without deviating from the scope of the invention. In this example, both sequence 1110 and sequence 1120 include respective matching 5-grams 1112, 1122 in the first 12 interactions. Since three matching 5-gram sequences 1102, 1112, 1122 are found, this may indicate that this 5-gram is a potential candidate for process automation. The number of matches may also be stored in some embodiments.

After the matching sequences of 5-grams are identified for the first user, the 5-grams for the second use may be compared to the third user and any subsequent users to find new matches, potentially with the matching sequences that have already been found removed (e.g., by storing the interactions in a queue data structure and removing them from the queue when a match is found). This process may be repeated for all users until the second-to-last user's interactions have been analyzed. If a range of n values is to be considered, n may be incremented, and the process may be repeated until all n-gram sizes in the range have been analyzed.

The process steps performed in FIGS. 9 and 10 may be performed by a computer program, encoding instructions for the processor(s) to perform at least part of the process(es) described in FIGS. 9 and 10, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 9 and 10, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:

providing, by a computing system, a generative artificial intelligence (AI)/machine learning (ML) model with data comprising time-ordered interactions of a plurality of users with respective user computing systems;

training the generative AI/ML model, by the computing system, to recognize an outcome of the time-ordered interactions and to determine one or more processes that lead to the outcome; and deploying the trained generative AI/ML model, wherein the training of the generative AI/ML model to recognize the outcome comprises training the generative AI/ML model to look backwards in data pertaining to the user interactions, the user interactions themselves, or both, and the outcome comprises an end state of the generative AI/ML model.

2. The computer-implemented method of claim 1, wherein the determining of the one or more processes that lead to the outcome comprises the generative AI/ML model looking backwards at priors using backpropagation and rating the priors that most significantly contributed to the outcome.

3. The computer-implemented method of claim 1, wherein the determining of the one or more processes that lead to the outcome comprises the generative AI/ML model resolving a signal that lead to the outcome into sub-signals and determining which sub-signals most strongly contributed to the outcome.

4. The computer-implemented method of claim 1, wherein the training of the generative AI/ML model further comprises training the generative AI/ML model to recreate a sequence that lead to the outcome based on the data pertaining to the user interactions, the user interactions themselves, or both.

5. The computer-implemented method of claim 1, further comprising:

training the generative AI/ML model, a robotic process automation (RPA) designer application, or both, to associate user interactions with RPA activities.

6. The computer-implemented method of claim 5, further comprising:

analyzing recorded real user interactions of a plurality of users with respective computing systems and determining the outcome, by the trained generative AI/ML model.

7. The computer-implemented method of claim 6, further comprising:

analyzing the recorded real user interactions to determine user interactions that lead to the outcome, by the trained generative AI/ML model; and generating one or more respective RPA workflows comprising activities that implement the user interactions that lead to the outcome.

8. The computer-implemented method of claim 7, further comprising:

making the one or more generated RPA workflows accessible to the RPA designer application.

9. The computer-implemented method of claim 7, wherein the determining of the user interactions that lead to the outcome comprises trying time-ordered interactions before the outcome was achieved to attempt to replicate the outcome.

10. The computer-implemented method of claim 6, further comprising:

strengthening nodes in neural network priors using back-propagation until the outcome can be replicated, by the trained generative AI/ML model.

11. The computer-implemented method of claim 10, further comprising:

generating one or more respective RPA workflows leading to the outcome by adding one or more activities that call the generative AI/ML model.

12. The computer-implemented method of claim 11, further comprising:

making the one or more generated RPA workflows accessible to one or more RPA designer applications.

13. The computer-implemented method of claim 1, wherein the generative AI model is a large language model (LLM), a generative adversarial network (GAN), a variational autoencoder (VAE), or a transformer.

14. A non-transitory computer-readable medium storing a computer program, the computer program configured to cause at least one processor to:

analyze recorded real user interactions of a plurality of users with respective computing systems and determine user interactions in the recorded real user interactions that lead to an outcome, via a generative artificial intelligence (AI)/machine learning (ML) model; and generate one or more respective robotic process automation (RPA) workflows comprising activities that implement the user interactions that lead to the outcome by recreating a sequence of the user interactions that lead to the outcome, wherein the outcome comprises an end state of the generative AI/ML model.

15. The non-transitory computer-readable medium of claim 14, wherein the computer program is further configured to cause the at least one processor to:

generate respective RPA robots implementing the one or more generated RPA workflows; and deploy the respective RPA robots to one or more user computing systems.

16. The non-transitory computer-readable medium of claim 14, wherein the computer program is further configured to cause the at least one processor to:

make the one or more generated RPA workflows accessible to one or more RPA designer applications.

17. The non-transitory computer-readable medium of claim 14, wherein the determining of the time-ordered user interactions that lead to the outcome comprises trying the time-ordered user interactions before the outcome was achieved to attempt to replicate the outcome.

18. The non-transitory computer-readable medium of claim 14, wherein the generative AI model is a large language model (LLM), a generative adversarial network (GAN), a variational autoencoder (VAE), or a transformer.

19. A system, comprising:

memory storing computer program instructions; and at least one processor configured to execute the computer program instructions, wherein the computer program instructions are configured to cause the at least one processor to:

analyze recorded real user interactions of a plurality of users with respective computing systems and determine an outcome based on the analysis, via a generative artificial intelligence (AI)/machine learning (ML) model, and analyze recorded real user interactions of a plurality of users with respective computing systems and determine user interactions in the recorded real user interactions that lead to the outcome, strengthen nodes in neural network priors using backpropagation until the outcome can be replicated, or both, by the generative AI/ML model, wherein the outcome comprises an end state of the generative AI/ML model.

20. The system of claim 19, wherein the computer program instructions are further configured to cause the at least one processor to:

generate one or more respective robotic process automation (RPA) workflows leading to the outcome by adding one or more activities that call the generative AI/ML model.

21. The system of claim 20, wherein the computer program instructions are further configured to cause the at least one processor to:

generate respective RPA robots implementing the one or more generated RPA workflows; and deploy the respective RPA robots to one or more user computing systems.

22. The system of claim 19, wherein the determining of the user interactions that lead to the outcome comprises trying time-ordered interactions before the outcome was achieved to attempt to replicate the outcome.

23. The system of claim 19, wherein the generative AI model is a large language model (LLM), a generative adversarial network (GAN), a variational autoencoder (VAE), or a transformer.

\* \* \* \* \*